(12) United States Patent
Sayama

(10) Patent No.: US 8,287,037 B2
(45) Date of Patent: Oct. 16, 2012

(54) ERRONEOUS OPERATION PREVENTING DEVICE AND STOWABLE VEHICLE SEAT

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 239 days.

(21) Appl. No.: 12/920,714

(22) PCT Filed: Feb. 27, 2009

(86) PCT No.: PCT/JP2009/053643
§ 371 (c)(1),
(2), (4) Date: Sep. 2, 2010

(87) PCT Pub. No.: WO2009/110375
PCT Pub. Date: Sep. 11, 2009

(65) Prior Publication Data
US 2011/0001344 A1 Jan. 6, 2011

(30) Foreign Application Priority Data
Mar. 3, 2008 (JP) .................................. 2008-052540

(51) Int. Cl.
*B60N 2/30* (2006.01)
(52) U.S. Cl. ....................................... 297/15; 296/65.09
(58) Field of Classification Search .................... 297/15, 297/326, 344.1; 296/65.09
See application file for complete search history.

(56) References Cited

U.S. PATENT DOCUMENTS

| | | | | |
|---|---|---|---|---|
| 6,231,101 B1 * | 5/2001 | Kamida et al. | ............. | 296/65.09 |
| 7,201,425 B2 * | 4/2007 | Tsujibayashi et al. | ...... | 296/65.09 |
| 7,252,320 B2 * | 8/2007 | Tsujibayashi et al. | ...... | 296/65.09 |
| 8,123,272 B2 * | 2/2012 | Ito et al. | .......................... | 297/15 |

FOREIGN PATENT DOCUMENTS

| | | | |
|---|---|---|---|
| JP | 11-123966 A | | 5/1999 |
| JP | 2001-121997 A | | 5/2001 |
| JP | 2005-225376 A | | 8/2005 |
| JP | 2006-082698 A | | 3/2006 |
| JP | 2006327285 A | * | 12/2006 |

* cited by examiner

*Primary Examiner* — Anthony D Barfield
(74) *Attorney, Agent, or Firm* — Drinker Biddle & Reath LLP

(57) ABSTRACT

A seat is provided having an erroneous operation preventing device in which a braking member secured to a strap is locked to regulate a folding operation in a stowing operation that includes an opening portion for guiding the strap to the seat back rear face side, a rotating member that is brought into contact with the strap, a pair of first brackets and upstanding separately on both sides of the opening portion and supporting the both end portion sides of the rotating member from above, a pair of connecting members and supporting both end portion sides of the rotating members from below while being urged toward the first brackets and side, and a movable member rotatably supported by the second bracket secured to the seat back side and connected to the connecting member. The movable member includes locking portions that lock the braking member and protrudes in a rotating direction.

9 Claims, 19 Drawing Sheets

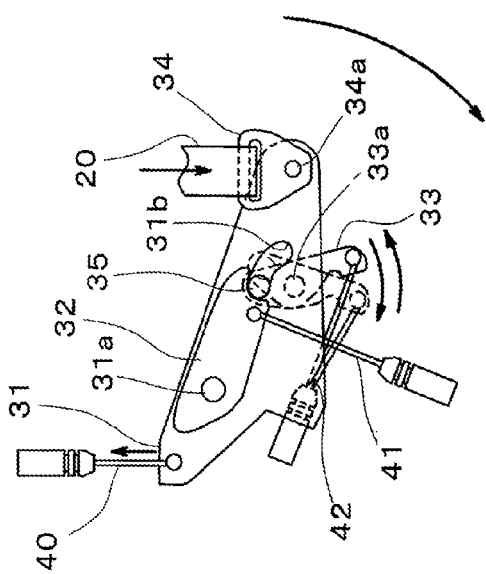
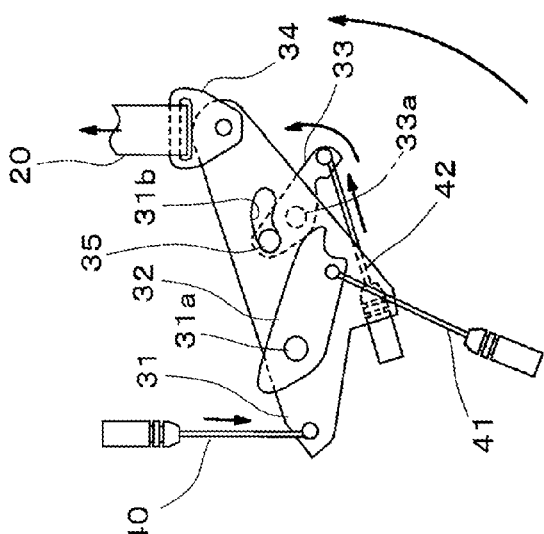
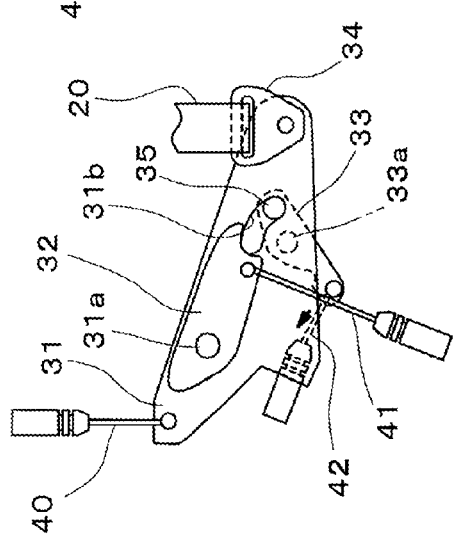

FIG. 15A
FIG. 15B
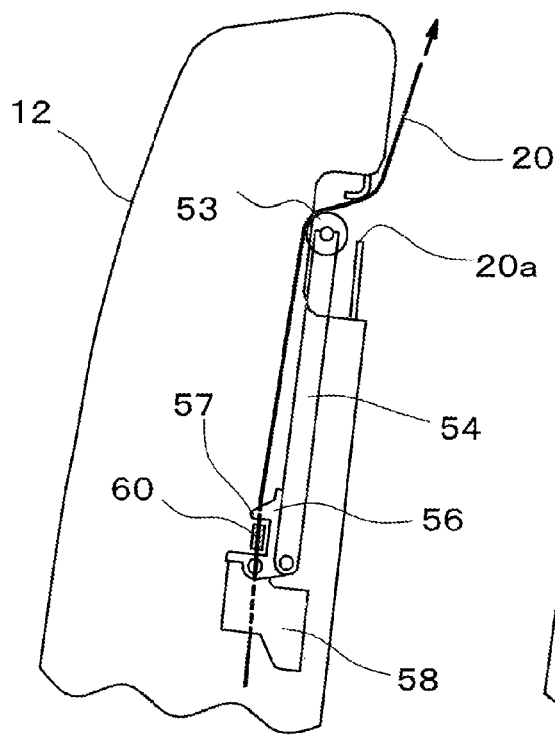
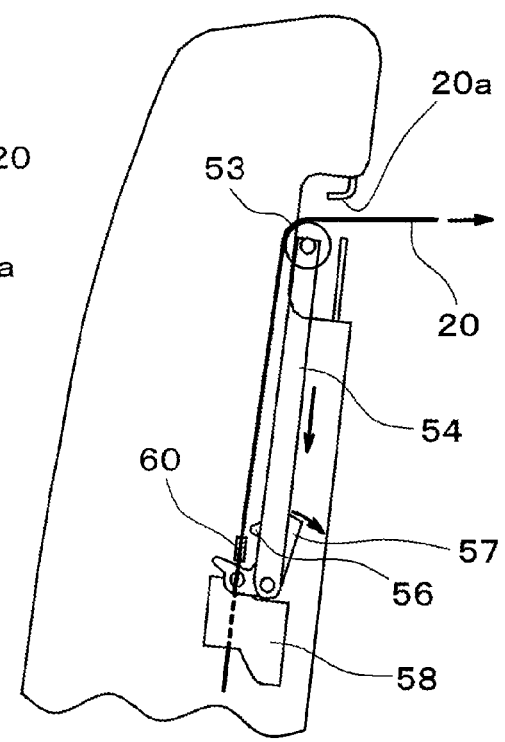

ERRONEOUS OPERATION PREVENTING DEVICE AND STOWABLE VEHICLE SEAT

CROSS REFERENCE TO RELATED APPLICATIONS

This application is the U.S. national phase of the International Patent Application No. PCT/JP2009/053643, filed Feb. 27, 2009, which claims the benefit of Japanese Patent Application No. 2008-052540, filed Mar. 3, 2008, the entire content of which is incorporated herein by reference.

BACKGROUND

The present invention relates to an erroneous operation preventing device and a stowable vehicle seat and particularly to an erroneous operation preventing device and a stowable vehicle seat that reliably perform stowing and returning operations.

A stowable vehicle seat is known, along with an associated technique, that has a rear end portion of a seat cushion constituting a vehicle seat that is supported on the front side of a containing recess portion (stowage recess portion) formed in a vehicle body floor rotatably in a front-and-rear direction, where the vehicle seat is rotated rearward while a seat back is folded down onto the seat cushion to be stowable in the containing recess portion.

That is, as shown in Japanese Laid-Open Patent No. 2006-82698 ("the '698 Patent"), rotating shafts disposed at both side edge portions on the right and left of the front portion of the containing recess portion and brackets disposed at right and left portions on the rear end portion of the seat cushion are provided, and the right and left brackets are disposed while supporting the rotating shafts so that the rear end portion of the seat cushion is supported rotatably in the front-and-rear direction so that the seat is contained in the containing recess portion.

In the technique of the '698 Patent, operating elements for a reclining mechanism (reclining lock) and a leg-portion unlocking mechanism (striker lock) that operate in containing (stowing) and returning of the stowable vehicle seat are provided for each function. That is, as the operating elements for the reclining mechanism and the leg-portion unlocking mechanism, a tension strap (strap) and a lever are used, respectively. These operating elements are installed on the seat rear face side, which is unreachable in a seated state in order to prevent an erroneous operation by children and the like.

An unlocking operation of the reclining mechanism by the strap is performed by an operator who pulls the strap rearward of the seat from the trunk side. Usually, the strap is attached to the seat rear face side as mentioned above, and there is no fear of an erroneous operation.

However, since the lock of the reclining mechanism is constructed to be unlocked also by pulling the strap to above the seat back, if the strap is pulled upward for some reason, there is a fear that the lock of the reclining mechanism is unlocked, and the seat back makes a movement that cannot be predicted by a passenger.

Moreover, the strap might be also used as the operating element in a seat in which the operating elements separated for each of the functions of the reclining unlocking mechanism and the leg-portion unlocking mechanism are integrated into single operation element, and the problem similar to the above technique is caused.

SUMMARY

In view of the above problems, an object of various embodiments of the present invention is to provide a stowable vehicle seat having an erroneous operation preventing device that can reliably perform stowing and returning operations.

Also, another object is to provide a stowable vehicle seat having an erroneous operation preventing device that is also effective in seat arrangement other than the stowing and returning operations.

According to a stowable vehicle seat having an erroneous operation preventing device according to an embodiment, the above problems are solved by an erroneous operation preventing device that regulates a stowing or folding operation of a rearwardly rotatable stowable vehicle seat that is rotated rearward and stowed by pulling a strap, by locking a braking member secured to the strap, including an opening portion for guiding the strap to a rear face side of a seat back of the stowable vehicle seat, a rotating member that contacts the strap, first brackets standing up separately on both sides of the opening portion in either direction of a front or the rear face side of the seat back and supporting the both end portion sides of the rotating member from one side, connecting members supporting the both end portion sides of the rotating member at least from the opposite sides, an urging element for urging at least one of the connecting members to the first bracket side all the time, a second bracket disposed in either direction of the front or rear face side of the seat back, and a movable member rotatably supported by the second bracket and connected to the connecting member.

As mentioned above, since the opening portion for guiding the strap to the rear face side of the seat back of the stowable vehicle seat, the rotating member that contacts the strap, the first brackets standing up separately on both sides of the opening portion in either direction of the front or rear face side of the seat back that supports the both end portion sides of the rotating member from one side, the connecting members supporting the both end portion sides of the rotating member at least from the opposite sides, the urging element for urging at least one of the connecting members to the first bracket side all the time, the second bracket disposed in either direction of the front or rear face side of the seat back, and the movable member rotatably supported by the second bracket and connected to the connecting member are provided, only when the strap is pulled downward rearward of the seat back, the rotating member is pushed by the strap and moved against the urging force, a state where the braking member secured to the strap is locked is unlocked, and the strap is brought into a pullable state. That is, if the strap is pulled and operated in some directions such as upward or downward by improper or unintentional operation or the like, an operating force is not transmitted to a link mechanism connected to a reclining mechanism or a leg-portion unlocking mechanism, an unpredictable seat movement is prevented, and more reliable operability can be ensured.

The movable member may include a pair of plate bodies rotatably and pivotally supported and separately disposed and a first connection portion that connects the plate bodies, and at least one of the plate bodies preferably has a locking portion that locks the braking member of the strap and extends in a rotating direction.

As mentioned above, the movable member includes the pair of plate bodies rotatably and pivotally supported and separately disposed and the first connection portion that connects the plate bodies, and at least one of the plate bodies preferably has the locking portion that locks the braking member of the strap and extends in a rotating direction, and only when the strap is pulled to the rear side of the seat back, the rotating member is pushed by the strap and moved, and also, the movable member is rotated in conjunction with the movement of the rotating member. Thus, the braking member secured to the strap is unlocked from the state of being locked by the locking portion, and the strap is brought to a pullable state. That is, if the strap is pulled and operated in directions such as upward or downward by improper or unintentional operation or the like, the operating force is not transmitted to the link mechanism, the unpredictable seat movement is prevented, and more reliable operability can be ensured. Moreover, since the pulling direction of the strap operated by this erroneous operation preventing device is a direction with respect to the seat back, even in seat arrangements in which the seat is at a stowed and returned position and the like, the seat operates similarly, and more reliable operability can be ensured.

Also, it is preferable that the opening portion partially has a portion with a small opening width through which the braking member of the strap cannot pass.

As mentioned above, since the opening portion partially has a portion with a small opening width through which the braking member of the strap cannot pass, if the strap is operated in a direction other than a predetermined direction, the braking member secured to the strap cannot pass through the opening portion, and thus, the operating force is not transmitted to the link mechanism, the unpredictable seat movement can be prevented, and more reliable operability can be ensured.

More specifically the second bracket includes a pair of support portions rotatably supporting each of the pair of plate bodies disposed on the movable member and a second connection portion connecting the pair of support portions, and the strap is preferably inserted through between the first connection portion of the movable member and the second connection portion of the second bracket.

As mentioned above, since the second bracket includes the pair of support portions rotatably supporting each of the pair of plate bodies disposed on the movable member and the second connection portion connecting the pair of support portions, and the strap is inserted through between the first connection portion of the movable member and the second connection portion of the second bracket, a path through which the strap is disposed can be limited, and even if the strap loosens, the braking member secured to the strap can be arranged at a predetermined position, and a locking or an unlocking operation can be reliably performed.

Moreover, since the device is configured such that by pulling the strap to the rear side of the seat back, the rotating member is pushed down by the strap and by rotating the movable member through the connecting member, the lock of the braking member by the locking portion is unlocked so that the regulation on the movement of the strap is canceled, unpredictable seat movement can be prevented, and reliable operability can be ensured.

Moreover, since the device is configured such that by pulling the strap to the rear side of the seat back, the rotating member is pushed down by the strap so that the braking member of the strap can pass through the opening portion, the unpredictable seat movement can be prevented, and reliable operability can be ensured.

The above problems are also solved by a rearwardly rotatable stowable vehicle seat comprising an erroneous operation preventing device that regulates a stowing or folding operation of the stowable vehicle seat that is rotated rearward and stowed by pulling a strap, by locking a braking member secured to the strap, the erroneous operation preventing device including an opening portion for guiding the strap to a rear face side of a seat back of the stowable vehicle seat, a rotating member that contacts the strap, first brackets standing up separately on both sides of the opening portion in either direction of a front or the rear face side of the seat back and supporting the both end portion sides of the rotating member from one side, connecting members supporting the both end portion sides of the rotating member at least from the opposite sides, an urging element for urging at least one of the connecting members to the first bracket side all the time, a second bracket disposed in either direction of the front or rear face side of the seat back, and a movable member rotatably supported by the second bracket and connected to the connecting member.

When configured as above, if the strap is pulled and operated in some directions such as upward or downward by improper or unintentional operation or the like, an operating force is not transmitted to a link mechanism connected to a reclining mechanism or a leg-portion unlocking mechanism, the unpredictable seat movement is prevented, and more reliable operability can be ensured.

According to an embodiment of the erroneous operation preventing device, such an erroneous operation preventing device can be provided so that only when the strap is pulled to the rear side of the seat back, the rotating member is pushed by the strap and moved against the urging force, a state where the braking member secured to the strap is locked is unlocked, and the strap is brought into a pullable state, and thus, if the strap is pulled and operated in some directions such as upward or downward by improper or unintentional operation or the like, an operating force is not transmitted to a link mechanism, the unpredictable seat movement is prevented, and more reliable operability can be ensured.

In an embodiment of the erroneous operation preventing device, such an erroneous operation preventing device can be provided so that only when the strap is pulled to the rear side of the seat back, the rotating member is pushed by the strap and moved, and also, the movable member is rotated in conjunction with the movement of the rotating member.

In an embodiment of the erroneous operation preventing device, such an erroneous operation preventing device can be provided so that if the strap is operated in a direction other than a predetermined direction, the braking member secured to the strap cannot pass through the opening portion, and thus, the operating force is not transmitted to the link mechanism, the unpredictable seat movement can be prevented, and more reliable operability can be ensured.

In an embodiment of the erroneous operation preventing device, such an erroneous operation preventing device can be provided so that since a path through which the strap is disposed can be limited, even if the strap loosens, the braking member secured to the strap can be arranged at a predetermined position, and a locking or an unlocking operation can be reliably performed.

In an embodiment of the stowable vehicle seat, such a stowable vehicle seat can be provided so that if the strap is pulled and operated in some directions such as upward or downward by improper or unintentional operation or the like, the unpredictable seat movement is prevented, and more reliable operability can be ensured.

BRIEF DESCRIPTION OF DRAWINGS

The invention is illustrated in various embodiments illustrated in the following figures and described in more detail below.

FIGS. 13A-C are operational explanatory side-view diagrams of the link mechanism when the stowable vehicle seat according to the first embodiment of the present invention is subjected to the returning operation;

FIGS. 15A, B are operational explanatory side-view diagrams of the stopper mechanism according to the first embodiment of the present invention;

DETAILED DESCRIPTION

Embodiments of the present invention will be described below referring to the attached drawings. Members, arrangement and the like described below do not limit the present invention but it is natural that various variations are possible according to the gist of the present invention.

First Embodiment

FIGS. 1 to 16 show a first embodiment of the present invention. First, a configuration of a seat S according to this embodiment will be described based on FIGS. 1 to 4.

A vehicle equipped with the seat S according to this embodiment includes three-row seats arranged in series in a longitudinal direction, and seats on the third row are configured stowable. The seat S according to this embodiment relates to the third-row seats. On the rear of the seat S, a stowage recess portion 5 as stowing area that stows the seat S is disposed on a vehicle body floor 4. A floor carpet, not shown, is folded over substantially the entire surface of the vehicle body floor 4.

Figure 1:
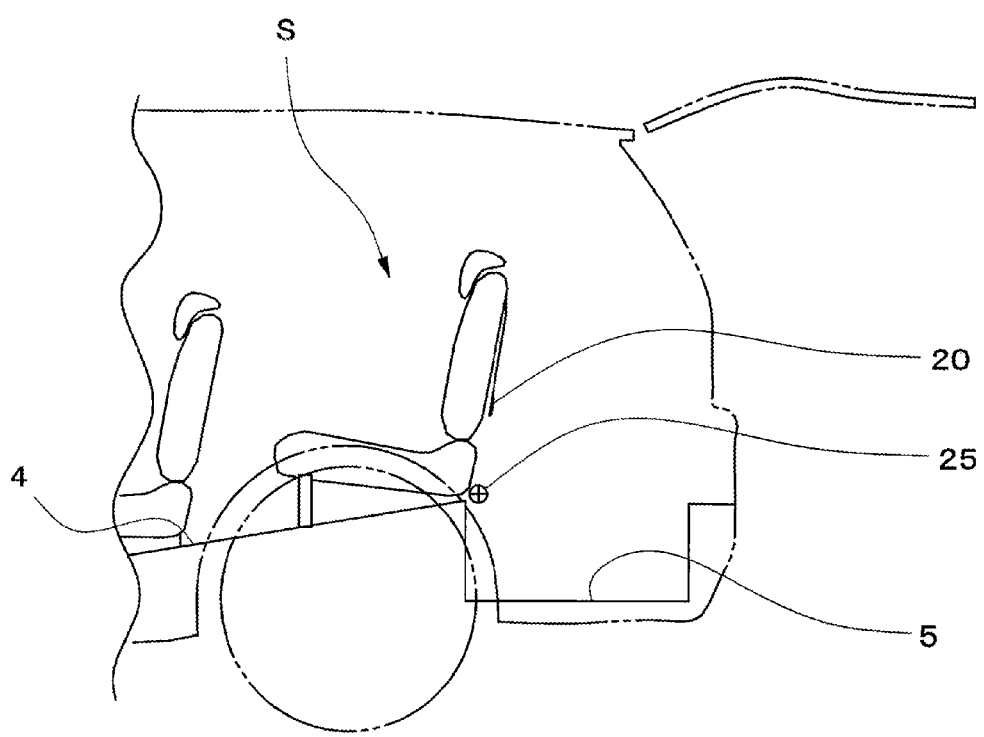
FIG. 1 is a side schematic diagram of a vehicle rear part equipped with a stowable vehicle seat according to an embodiment of the present invention.
Figure 2:
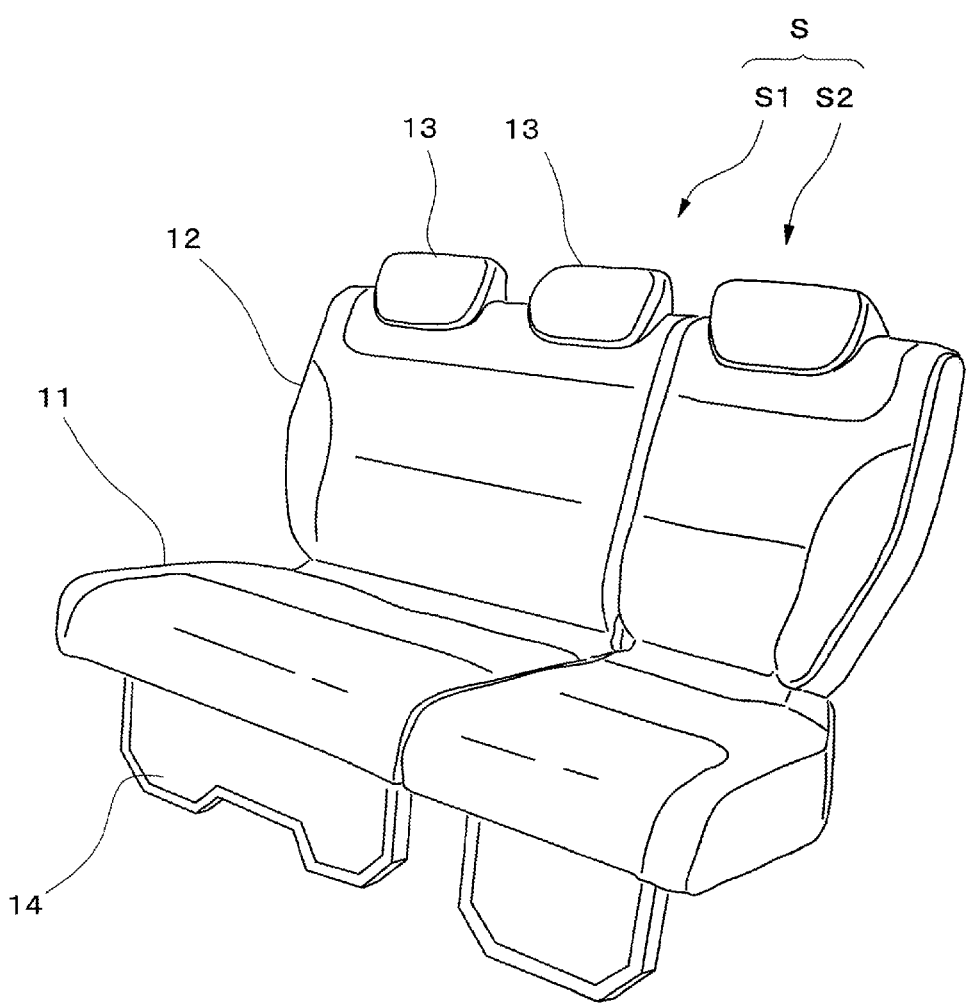
FIG. 2 is a front perspective view of a stowable vehicle seat according to a first embodiment of the present invention.

FIG. 2 schematically shows the seat S according to this embodiment. The seat S has seats for three people crosswise and is constituted by a right-side seat S1 for two people located on the right side with respect to a traveling direction of the vehicle and a left-side seat S2 for one person.

In the following explanation, the description of right/left side indicating the direction refers to a direction with respect to the traveling direction of the vehicle.

Also, since a containing mechanism and an operating method are the same for both the right-side seat S1 and the left-side seat S2, an arbitrary one side will be referred to as the seat S in the following explanation.

Figure 3:
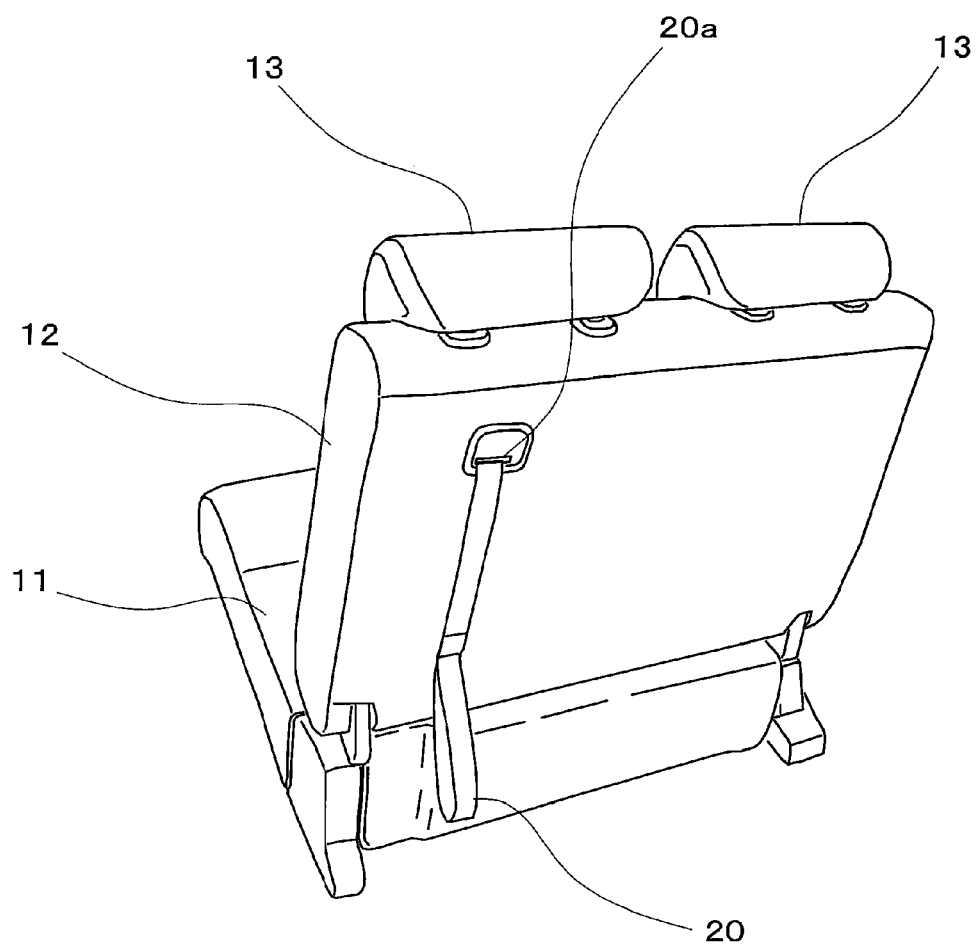
FIG. 3 is a rear perspective view of the stowable vehicle seat according to the first embodiment of the present invention.

The seat S includes a seat cushion 11, a seat back 12, head rests 13 and 13, and a front-side leg portion 14. Also, as shown in FIG. 3, a strap 20 that performs a stowing and returning operation of the seat S extends outward from the rear side of the seat back 12 through a strap outlet 20a.

In the seat S according to this embodiment, operating elements of a reclining unlocking mechanism and a leg-portion unlocking mechanism operated when the stowable vehicle seat is stowed and returned are integrated into one as the strap 20.

The strap 20 is the operating element operated during the stowing and returning operation of the seat S and is constituted by a wide bendable belt of a length of approximately 1 m so that a passenger can operate the same easily. Since the stowing and returning operation of the seat S can be performed by a pulling operation of the strap 20, an operation load can be reduced as compared with an operation with a lever. In a state in which the stowing and returning operation of the seat S is not performed, a part of the strap 20 is hooked on the rear face of the seat back 12 by a planer fastener.

Figure 4:
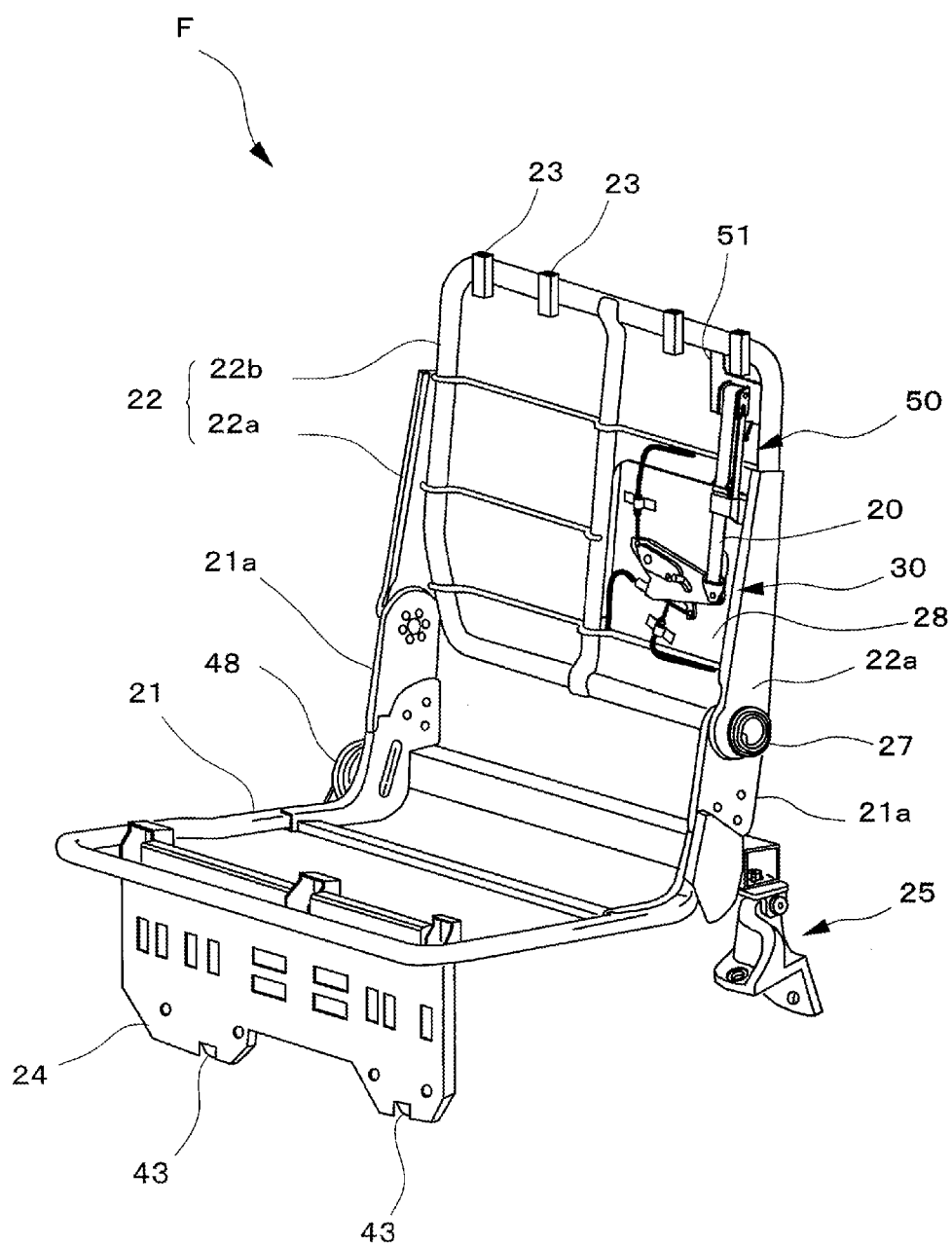
FIG. 4 is an outline perspective view of a seat frame according to the first embodiment of the present invention.
Figure 5:
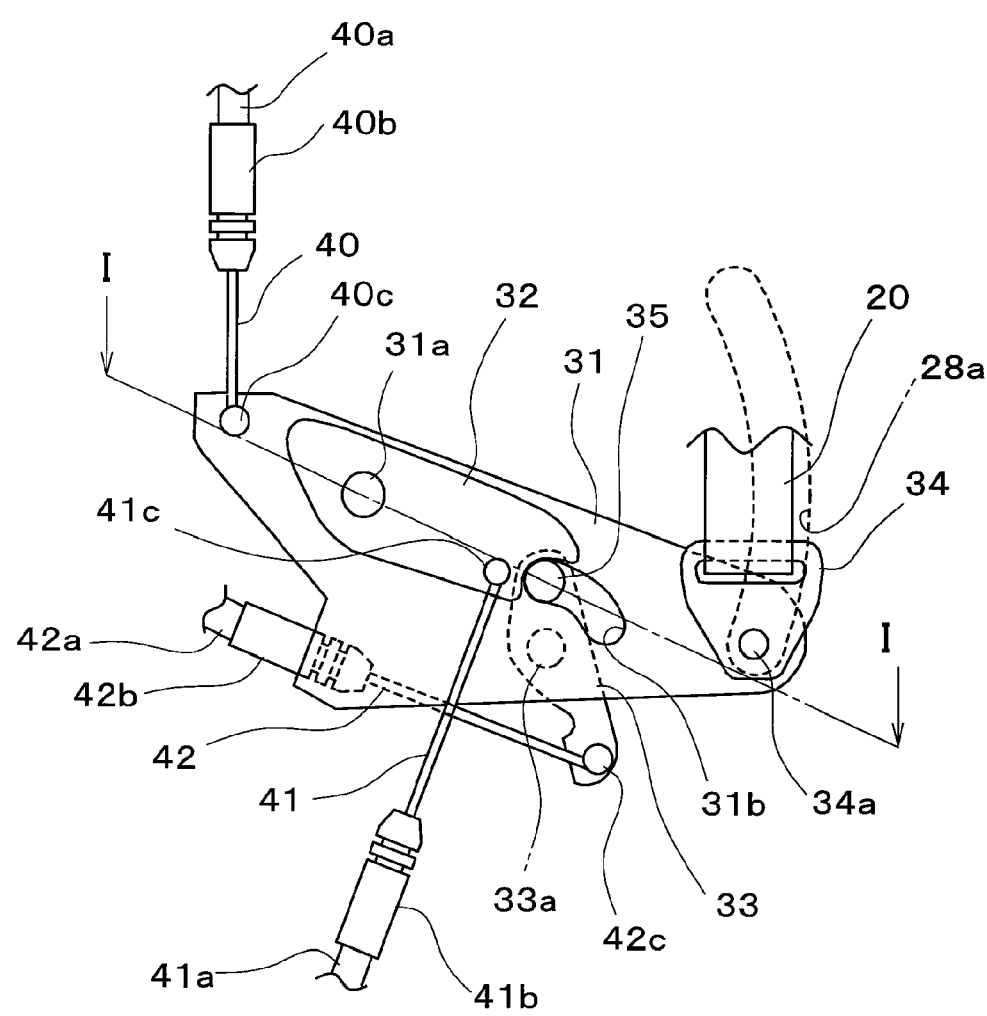
FIG. 5 is an enlarged explanatory side-view diagram of a link mechanism according to the first embodiment of the present invention.
Figure 6:
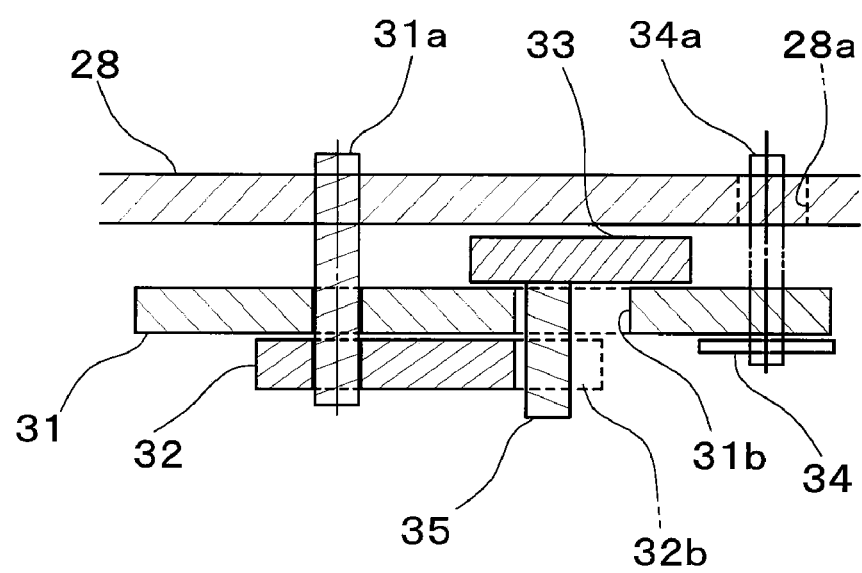
FIG. 6 is a I-I sectional explanatory diagram of the link mechanism according to the first embodiment of the present invention.

A seat frame F of the seat S shown in FIG. 4 includes a seat-cushion frame 21 constituting the seat cushion 11, a seat-back frame 22 constituting the seat back 12, and a front-side leg portion frame 24. Also, above the seat-back frame 22, pillars of the head rest frames, not shown, are disposed through pillar support portions 23.

The front-side leg portion frame 24 is covered by a cover material, not shown, so as to constitute the front-side leg portion 14. The front-side leg portion frame 24 is supported on the front side of the seat-cushion frame 21 at an upper part rotatably in the front-and-rear direction, and at a lower part of the front-side leg portion frame 24, locking claws 43 and 43 connected to leg-portion strikers 44 disposed on the vehicle body floor 4 side that are lockable and unlockable are arranged at two spots.

The seat-cushion frame 21 constitutes the seat cushion 11 which is covered by a cushion pad, cover and the like, not shown, and supports the passenger from below. The front side of the seat-cushion frame 21 is supported by the front-side leg portion frame 24 on the vehicle body floor 4 side, that are lockable and unlockable, while the rear end portion side thereof is supported by seat support portions 25 and 25 rotatably in the front-and-rear direction. A coil spring 48 is attached to the seat support portion 25 that urges the seat cushion 11 in the front rotating direction all the time and to alleviate an impact during the stowing.

Also, at the rear end portion of the seat-cushion frame 21, back-frame support portions 21a and 21a connected to the seat-back frame 22 are disposed.

The seat-back frame 22 constitutes the seat back 12 that is covered by a cushion pad or the like, not shown, and supports the back of a passenger from the back, and in this embodiment, it is formed by a substantially rectangular frame body. In more detail, the seat-back frame 22 includes two side frames 22a and 22a disposed separately in the crosswise direction and extending in the vertical direction and a center frame 22b, which is a substantially rectangular frame body sandwiched by the side frames 22a and 22a.

The lower end portion sides of the side frames 22a and 22a are connected to the back-frame support portions 21a and 21a through a reclining mechanism 27.

Inside the center frame 22b, which is a frame body, a back plate 28 in a substantially plate shape is disposed along the face supporting the back of the passenger. On the back plate 28, a link mechanism 30, which will be described below, is disposed. Also, a stopper mechanism 50, which will be described below, is disposed on the center frame 22b and the back plate 28.

Subsequently, a configuration of the link mechanism 30, a stowing and returning operation of the seat S, and an operation of the link mechanism 30 will be described referring to FIGS. 5 to 11.

First, the configuration of the link mechanism 30 will be described referring to FIGS. 5 to 9.

The link mechanism 30 is connected to the strap 20 operated in stowing and returning of the seat S and is provided with a function to appropriately cancel rotation of the reclining mechanism 27 and a lock state between the front-side leg portion 14 with the vehicle body floor 4 side in conjunction with the operation of the strap 20 and the state of the seat S and is formed on the back plate 28 as mentioned above.

The link mechanism 30 includes a first link member 31, a second link member 32, and a third link member 33 pivotally supported and rotatable, and a power transmission member is connected to each of the link members. They are configured to be operated in conjunction, respectively, according to the state among the power transmission members and the operation among the link members.

As the power transmission member, a reclining release wire 40 connected to the reclining mechanism 27, the strap 20 as the operating element, a leg-portion release wire 41 connected to the locking claw 43 of the front-side leg portion 14, and a cancel wire 42 that detects a folded-down state of the reclining mechanism 27 are provided.

The first link member 31 is a substantially inverted triangular member, which is flat in the crosswise direction, and the reclining release wire 40 as a power transmission member and the strap 20 through a strap connecting member 34 are locked at each of locking portions 34a and 40c disposed on both end portion sides. The first link member 31 is rotatably and pivotally supported on the back plate 28 by a first shaft portion 31a disposed between the locking portions 34a and 40c.

Between the first shaft portion 31a and the locking portion 34a, an arc-shaped long hole 31b is formed to draw a part of a concentric circle around a second shaft portion 33a, which will be described below.

Here, the other end portion sides of the reclining release wire 40 and the strap 20 locked to the first link member 31 will be described below.

Figure 8:
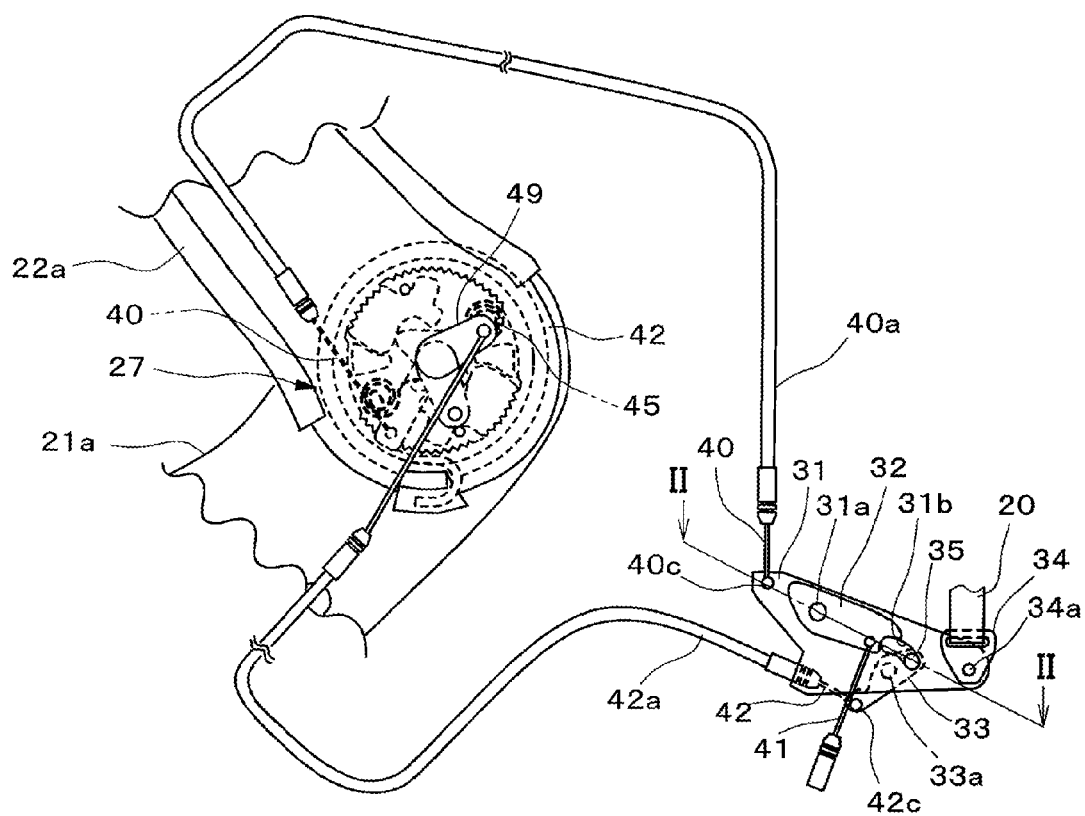
FIG. 8 is an explanatory side-view diagram of the link mechanism when a seat back is folded down according to the first embodiment of the present invention.
Figure 9:
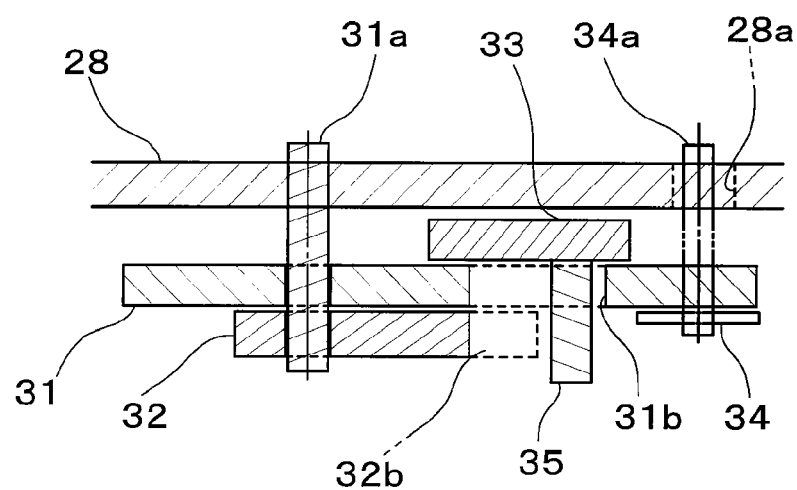
FIG. 9 is a II-II sectional explanatory diagram of the link mechanism according to the first embodiment of the present invention.

As shown in FIG. 8, the other end portion side of the reclining release wire 40 locked to the locking portion 40c of the first link member 31 is guided by a reclining release cable 40a and connected to the reclining mechanism 27 that unlocks the lock state of rotation of the seat back 12.

The reclining mechanism 27 is a mechanism that unlocks the lock state of the rotation of the reclining mechanism 27 if the reclining release wire 40 is pulled by an operation of the link mechanism 30 toward the link mechanism 30 side so that the seat back 12 can be rotated. The other end portion side of the strap 20 connected to the end portion side of the first link member 31 through the strap connecting member 34 is extended outward of the seat back 12 from the strap outlet portion 20a disposed on the rear face of the seat back 12 so as to facilitate the operation by the passenger. Power (the operation by the passenger) can be transmitted to the first link member 31 in conjunction with the passenger's operation of the strap 20.

That is, if the strap 20 is operated, the first link member 31 is rotated, and lock of the reclining mechanism 27 is unlocked.

The second link member 32 is a substantially rectangular member and is arranged on the first link member 31.

The second link member 32 is rotatably and pivotally supported by the first shaft portion 31a coaxially with the first link member 31, and a locking recess portion 32b brought into contact with a locking projection 35, which will be described below, is formed on the other end portion side. Between the first shaft portion 31a and the locking recess portion 32b, a locking portion 41c to which the leg-portion release wire 41 is locked, is formed.

The other end portion side of the leg-portion release wire 41 locked by the second link member 32 will be described below.

Figure 7:
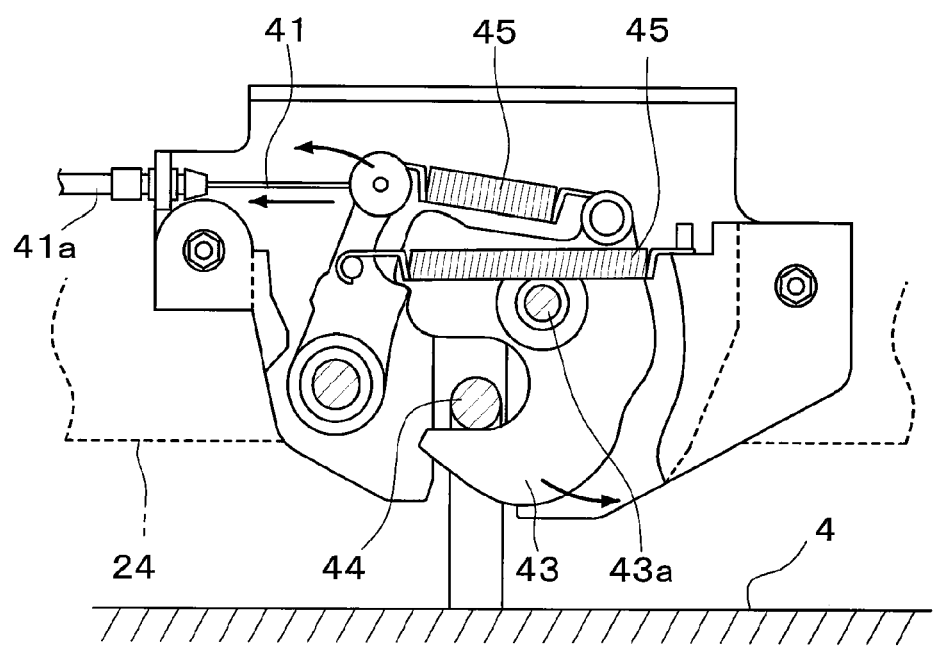
FIG. 7 is an outline explanatory side-view diagram of a locking portion of front-side leg portion according to the first embodiment of the present invention.

As shown in FIG. 7, the other end portion side of the leg-portion release wire 41 locked to the locking portion 41c of the second link member 32 is guided by a leg-portion release cable 41a and connected to a leg-portion unlocking mechanism as leg-portion locking means. The leg-portion unlocking mechanism is formed within the front-side leg portion frame 24, and if the leg-portion release wire 41 is pulled by the operation of the link mechanism 30 toward the link mechanism 30 side, the locking claw 43 connected to the leg-portion release wire 41 is rotated around a locking-claw rotating shaft 43a, lock with the leg-portion striker 44 on the vehicle body floor 4 side is unlocked, and the seat cushion 11 is brought into a rotatable state in the front-and-rear direction.

The leg-portion release wire 41 is urged by urging springs 45 and 45 to the locking claw 43 side all the time.

The third link member 33 is a substantially rectangular member, arranged between the first link member 31 and the back plate 28, and has the center part pivotally supported by the second shaft portion 33a rotatably to the first link member 31 side.

At the lower end portion side of the third link member 33, a cancel wire 42 is locked through a locking portion 42c.

At the upper end portion side, the cylindrical locking projection 35 is formed, and this locking projection 35 is inserted through the arc-shaped long hole 31b formed in the first link member 31 and brought into contact with the locking recess portion 32b of the second link member 32 so that the second link member 32 is locked so as to be rotated along with the first link member 31. Here, since the locking projection 35 is formed having an outer diameter slightly smaller than a width of the long hole 31b, while the long hole 31b is formed in an arc shape so as to draw a part of a concentric circle of the second shaft portion 33a as mentioned above, it is so configured that the locking projection 35 is moved along the long hole 31b along with the rotation of the third link member 33.

The other end portion side of the cancel wire 42 locked by the third link member 33 will be described below.

As shown in FIG. 8, the other end portion side of the cancel wire 42 locked by the locking portion 42c of the third link member 33 is guided by a cancel cable 42a and connected to a locking rib 49 formed on the reclining mechanism 27, which is a connection portion between the side frame 22a and the back-frame support portion 21a. This locking rib 49 is formed on the reclining mechanism 27 and mounted so as to rotate with the side frame 22a. The other end portion side of the cancel wire 42 is configured so that the locking rib 49 pulls the locking portion 42c formed on the third link member 33 through the cancel wire 42 while the seat back 12 is folded down and functions as a detector by rotating the third link member 33. That is, the reclining assembly includes the reclining mechanism 27 and the detector.

In this embodiment, the locking rib 49 locked to the other end portion side of the cancel wire 42 is formed on the reclining mechanism 27, but the rib may be formed at other lock positions as long as it is configured such that the cancel wire 42 is operated in a state in which the seat back 12 is folded down with respect to the seat cushion 11. Moreover, it may also be formed at a position away from the reclining mechanism 27, and in this case, the reclining assembly is configured such that the reclining mechanism 27 and the detector are provided at separate positions.

While the third link member 33 is not rotated, since the second link member 32 is locked to the first link member 31 by the locking projection 35, the second link member 32 is rotated with the rotation of the first link member 31 and pulls the leg-portion release wire 41.

If the third link member 33 is rotated, the locking projection 35 secured to the third link member 33 is moved along the long hole 31b. Since it is no longer in contact with the locking projection 35 at the locking recess portion 32b due to the movement of the locking projection 35, the lock between the rotation of the first link member 31 and the second link member 32 is unlocked.

At this time, by way of the operation of the strap 20, the second link member 32 is not rotated even if the first link member 31 is rotated, and the leg-portion release wire 41 locked by the second link member 32 is no longer pulled even if the first link member 31 is rotated.

That is, in the state in which the seat back 12 is folded down, it is so configured that the lock between the front-side leg portion 14 and the vehicle body floor 4 is not unlocked even if the strap 20 is pulled. In other words, by rotating the third link member 33, the second link member 32 can be brought into a non-rotatable state.

On the unlocking mechanism side (the other end portion side of the link mechanism 30) of the lock to which the reclining release wire 40 and the leg-portion release wire 41 are connected, respectively, an urging spring 45 is disposed so as to urge the reclining release wire 40 and the leg-portion release wire 41 in a direction to hold the lock state all the time. Thus, in a state in which the passenger is not operating the strap 20, with regard to the first link member 31 and the second link member 32, too, the rotation of the link mechanism 30 is urged in a direction to pull the strap 20 downward all the time through the strap connecting member 34.

In this embodiment, the locking portion 34a of the strap connecting member 34 disposed on the first link member 31 pivotally supports the strap connecting member 34 rotatably on the first link member 31 and the other end side (rear side) thereof is inserted through a guiding hole portion 28a formed in the back plate 28. Since the guiding hole portion 28a is formed in an arcuate shape to draw a part of a concentric circle of the first shaft portion 31a, the locking portion 34a can move within the guiding hole portion 28a with operation of the first link member 31. Also, by adjusting the length of the guiding hole portion 28a, upper and lower limits of a rotation amount of the first link member 31 can be set.

Also, end-portion members 40b and 41b, which are end portions on the link mechanism 30 side of the reclining release cable 40a and the leg-portion release cable 41a for guiding the reclining release wire 40 and the leg-portion release wire 41, respectively, are secured onto the back plate 28 by locking members, not shown. Similarly, an end-portion member 42b on the link mechanism 30 side of the cancel cable 42a for guiding the cancel wire 42 is secured to the first link member 31 by a locking member, not shown.

Subsequently, a stowing and returning operation of the seat S and an operation of the link mechanism 30 according to this embodiment will be described referring to FIGS. 10 to 13.

First, the stowing operation of the seat S will be described according to FIGS. 10A to 10F.

Figure 10A:
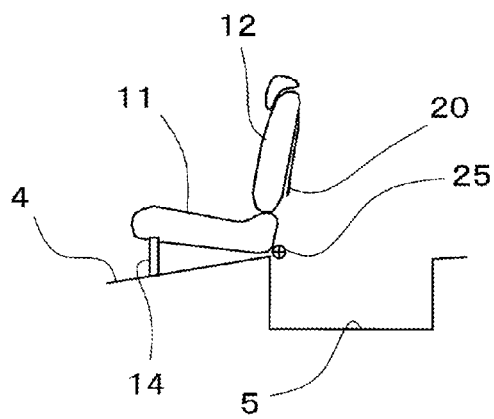
FIGS. 10A-F are explanatory side-view diagrams illustrating an operation procedure when the stowable vehicle seat according to the first embodiment of the present invention is subjected to a stowing operation.

FIG. 10A shows an installation state of the seat S. From the rear face side of the seat back 12, the strap 20 is extended.

Figure 10B:
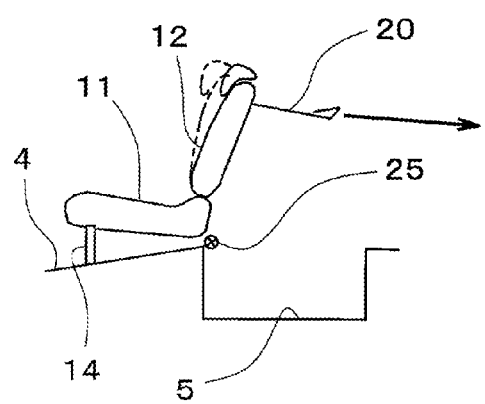

FIG. 10B shows a state in which the lock of the reclining mechanism 27 is unlocked. When the strap 20 is pulled rearward by the passenger, the lock of the reclining mechanism 27 is unlocked.

At this time, the seat back 12 to which the strap 20 is attached is urged to the front direction by the urging spring attached to the reclining mechanism 27. If the strap 20 is pulled against the urging direction, since it is configured such that the lock of the locking claw 43 of the front-side leg portion 14 is unlocked by a stress lower than a stress to lay the seat back 12 down rearward, the lock of the locking claw 43 is unlocked.

Figure 10C:
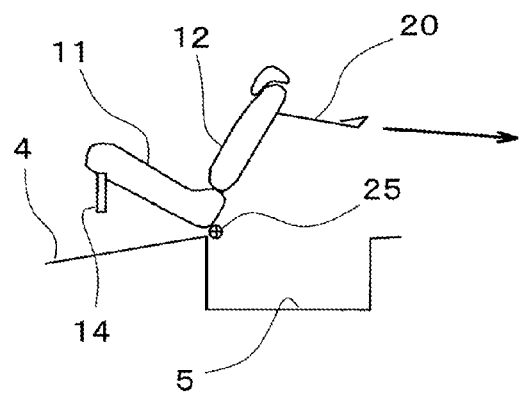

FIG. 10C shows a state in which the lock of the locking claw 43 of the front-side leg portion 14 is unlocked. That is, the lock of the locking claw 43 of the front-side leg portion 14 is unlocked, and the seat S is made rotatable rearward.

Figure 10D:
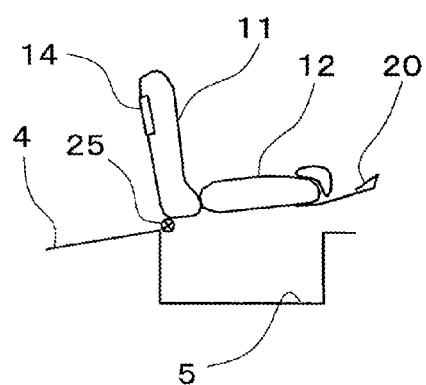
Figure 10E:
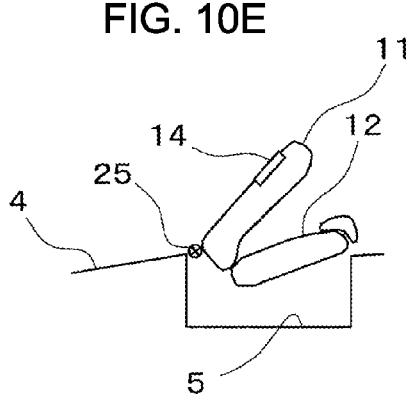

FIGS. 10D and 10E show a state in which the rearward rotation of the seat S is progressed. By further pulling the strap 20, the center of gravity of the seat S exceeds a middle point and thereafter, the seat S is rotated rearward by its own weight and reaches the stowed state. At this time, a rearward rotating speed of the seat S is reduced by the urging spring 48 (coil spring) attached to the seat support portion 25 so as to alleviate an impact due to stowage into the stowage recess portion 5. Also, the front-side leg portion 14 is also folded by its own weight. At this time, the seat back 12 is also folded by the urging spring attached to the reclining mechanism 27 and folded down onto the seat cushion 11.

Figure 10F:
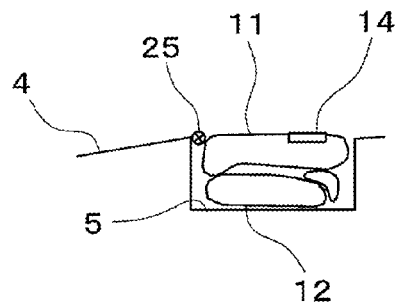

FIG. 10F shows a stowed state of the seat S, in which an opening portion of the stowage recess portion 5 forms an integral flat surface with the rear face of the seat cushion 11, and a large trunk is ensured.

That is, the passenger can stow the seat S in the installed state only by an operation to pull the strap 20 rearward.

In order to hold the stowed state more reliably, a locking mechanism may be disposed between the vehicle body floor 4 portion of the stowed recess portion 5 and the seat S.

An operation of the link mechanism 30 during the stowing operation of the above-mentioned seat S will be described according to FIG. 11.

Figure 11A:
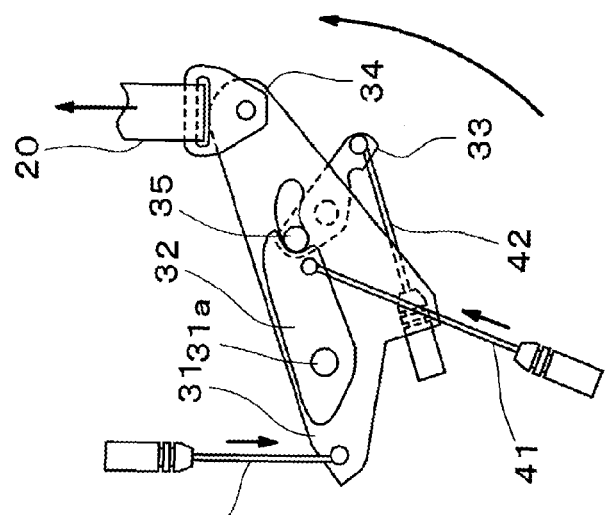
FIGS. 11A-C are operational explanatory side-view diagrams of the link mechanism when the stowable vehicle seat according to the first embodiment of the present invention is subjected to the stowing operation.

FIG. 11A shows a state of the link mechanism 30 in the installed state of the seat S (See FIG. 10A), which is a stage prior to the operation of the strap 20 by the passenger. The state of the link mechanism 30 at this time is referred to as an original position.

Figure 11B:
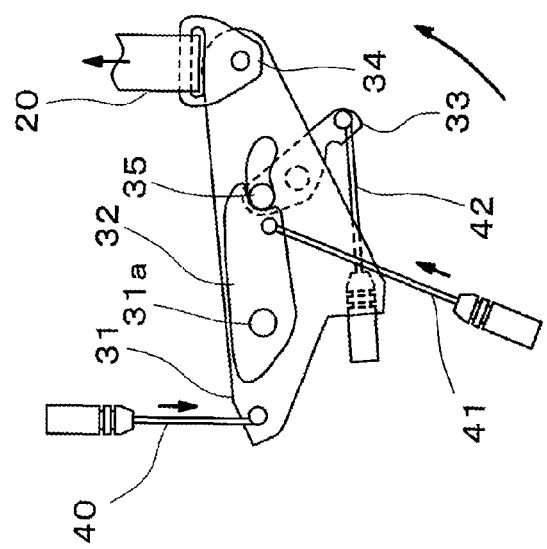

FIG. 11B shows a state of the link mechanism 30 when the lock of the reclining mechanism 27 is unlocked (FIG. 10B), which is a stage when the strap 20 is somewhat pulled rearward. Since the first link member 31 is rotated in the direction pulled by the strap 20 by the operation of the strap 20, the reclining release wire 40 is pulled with the rotation, and the lock of the reclining mechanism 27 is unlocked. At this time, since the seat back 12 is in the upstanding state with respect to the seat cushion 11, the cancel wire 42 is not pulled, the second link member 32 is rotated along with the first link member 31, and the leg-portion release wire 41 is also pulled. However, the lock by the locking claw 43 connecting the front-side leg portion 14 and the vehicle body floor 4 side is set so as not to be unlocked by the pulled amount in this state, and the lock of the leg portion is maintained.

Figure 11C:
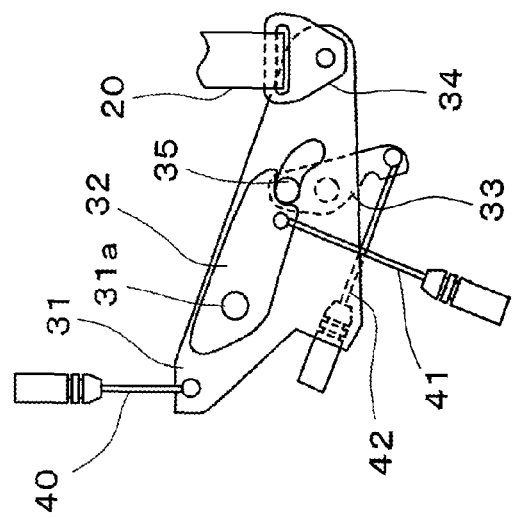

FIG. 11C shows a state (FIGS. 10C and 10D) of the link mechanism 30 when the lock between the reclining mechanism 27 and the locking claw 43 of the front-side leg portion 14 is unlocked and a state in which the strap 20 is further pulled. By pulling the strap 20 more strongly than the state (FIG. 10B) in FIG. 11B, the first link member 31 is also rotated largely. The second link member 32 is rotated along with the first link member 31, and the reclining release wire 40 and the leg-portion release wire 41 are further pulled. At this time, the lock of the leg portion is unlocked.

By stopping the operation of the strap 20 after the seat S has been stowed, the link mechanism 30 is returned to the state in FIG. 11A by the urging spring 45 attached to the unlocking mechanism side (the other end portion side of the link mechanism 30) to which the reclining release wire 40 and the leg-portion release wire 41 are connected, respectively. However, since the seat back 12 is stowed in the state (FIGS. 10E and 10F) folded down with respect to the seat cushion 11, the cancel wire 42 is pulled and the third link member 33 is held in the rotated state.

Subsequently, the returning operation of the seat S will be described according to FIGS. 12A to 12E.

Figure 12A:
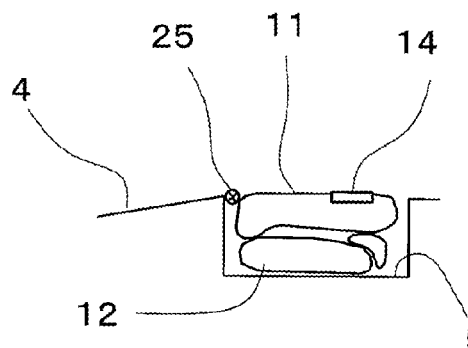
FIGS. 12A-E are explanatory side-view diagrams illustrating an operation procedure when the stowable vehicle seat according to the first embodiment of the present invention is subjected to a returning operation.

FIG. 12A shows a state in which the seat S is stowed. If the seat S is pulled out of the stowage recess portion 5, it is rotated forward around the seat support portion 25 as a rotating shaft.

Figure 12B:
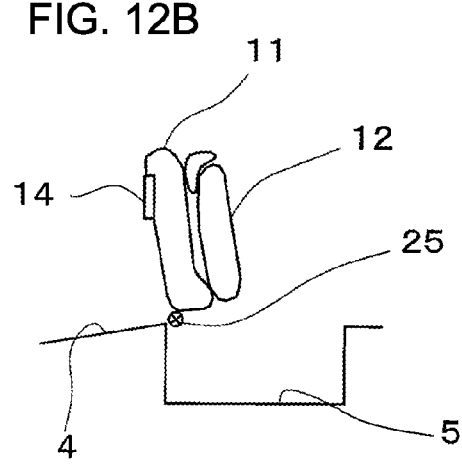

FIG. 12B shows a state of the forward rotation of the seat S, and the front-side leg portion 14 is extended below the seat cushion 11 by its own weight with the forward rotation of the seat S.

Figure 12C:
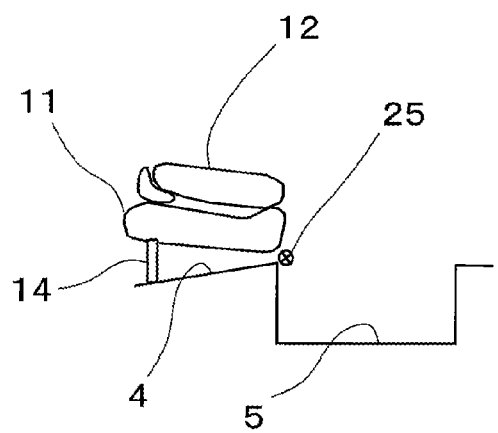

FIG. 12C shows a state in which the locking claw 43 of the front-side leg portion 14 of the seat S is locked to the vehicle body floor 4 side. The locking claw 43 is locked to the leg-portion striker 44 on the vehicle body floor 4 side by a pressure of the weight of the seat S. At this time, the seat back 12 is in the state folded down on the seat cushion 11.

Figure 12D:
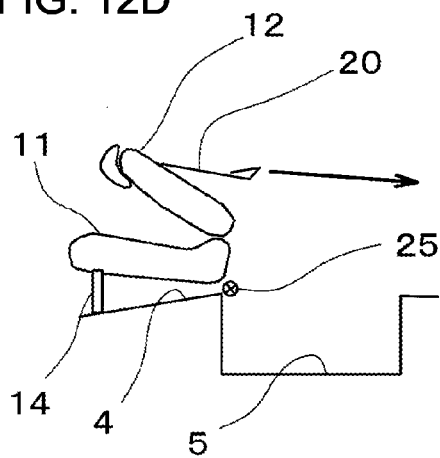

FIG. 12D shows an operation to pull the strap 20 rearward from the state in which the locking claw 43 of the front-side leg portion 14 of the seat S is locked to the vehicle body floor 4 side. At this time, since the locking claw 43 is maintained in the locked state, only the seat back 12 can be made to raise with respect to the seat cushion 11.

Figure 12E:
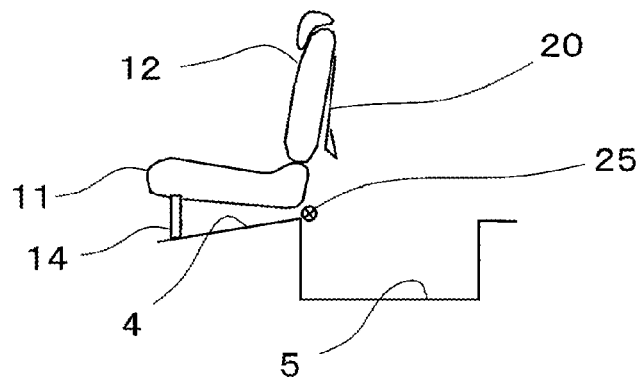

FIG. 12E shows a state in which the returning operation of the seat S is completed.

That is, the passenger can return the seat S only through the operation to pull the strap 20 rearward after rotating the seat S forward in the stowed state with the seat back 12 folded down.

The operation of the link mechanism 30 during the above-mentioned returning operation of the seat S will be described according to FIG. 13.

FIG. 13A shows a state of the link mechanism 30 from the stowed state (FIG. 12A) of the seat S to a stage (FIG. 12C) in which the seat S is rotated and the locking claw 43 is locked to the vehicle body floor 4 side. This is the state before the strap 20 is operated by the passenger, and since the operation is being performed in the state in which the seat back 12 is folded down, the cancel wire 42 is pulled, and the third link member 33 is held in the rotated state.

FIG. 13B shows a stage (FIG. 12D) in which the strap 20 is somewhat pulled rearward in order to raise the seat back 12. By way of the operation of the strap 20, the first link member 31 is rotated. With the rotation of the first link member 31, the reclining release wire 40 is pulled, the lock of the reclining mechanism 27 is unlocked, and the rearward rotation of the seat back 12 is made possible. At this time, since the locking projection 35 is moved together with the third link member 33, the second link member 32 is not locked and cannot be rotated even if the first link member 31 is rotated. Also, with raising of the seat back 12, the rotation amount of the third link member 33 is reduced, but since it is rotated exceeding a rotating range in which the locking projection 35 is brought into contact with the second link member 32, a state in which the locking recess portion 32b of the second link member 32 is not locked by the first link member 31 is maintained. Thus, a state in which the lock of the locking claw 43 connecting the front-side leg portion 14 and the vehicle body floor 4 side is not unlocked is maintained, and the seat back 12 can be made to raise with respect to the seat cushion 11 only by the operation to pull the strap 20.

FIG. 13C shows a state (FIG. 12E) in which the returning operation of the seat S is completed. By stopping the rearward pulling operation of the strap 20, the position of the first link member 31 is returned to the original position by urging from the reclining release wire 40 and the leg-portion release wire 41. At this time, since the seat back 12 is made to raise with respect to the seat cushion 11, the third link member 33 is in a state not pulled by the cancel wire 42. Thus, the third link member 33 can be rotated even with a slight stress, the second link member 32 is also returned to the original position and locked by the first link member 31, and each link member of the link mechanism 30 is returned to the state of original position.

Figure 14:
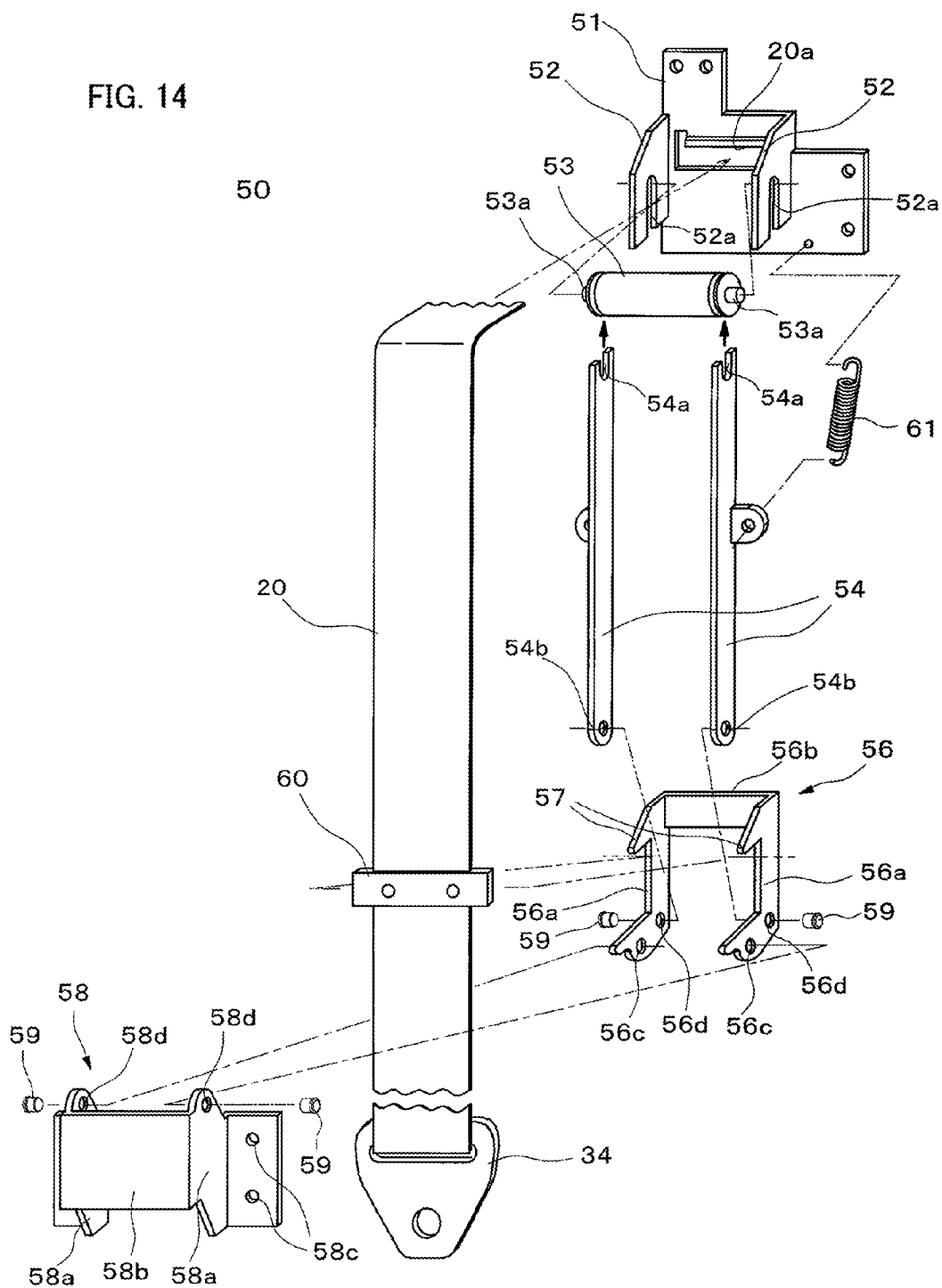
FIG. 14 is an exploded perspective view of a stopper mechanism according to the first embodiment of the present invention.

Subsequently, a configuration of the stopper mechanism 50 and an action during an operation will be described referring to FIGS. 14 to 16.

First, referring to FIG. 14, the configuration of the stopper mechanism 50 as an erroneous operation preventing device will be described.

The stopper mechanism 50 is a mechanism that prevents transmission of power (operating force of a passenger) from the strap 20 to the link mechanism 30 if the strap 20 is operated by an erroneous operation and as mentioned above, it is attached to the center frame 22b and the back plate 28.

The stopper mechanism 50 includes a stopper bracket 51 fastened to the center frame 22b, a pair of substantially rectangular first brackets 52 and 52 disposed upright with respect to the stopper bracket 51, the strap outlet portion 20a as an opening portion formed between the first bracket portions 52 and 52, a braking member 60 fastened to the strap 20, a rotating member 53 brought into contact with the strap 20, a pair of connecting members 54 and 54 supporting the rotating member 53 from below, an urging spring 61 as an urging element that urges the connecting member 54 to the first bracket 52 side all the time, a movable member 56 having locking portions 57 and 57 that lock the braking member 60, and a second bracket 58 that rotatably supports the movable member 56.

The stopper bracket 51 is a member made of steel or resin fastened above the center frame 22b by a fastening member such as a screw, rivet and the like or by welding, in which the strap outlet portion 20a that guides the strap 20 outward from the rear side of the seat S is formed. The first brackets 52 and 52 are formed upright with respect to the stopper bracket 51 at both side positions of the strap outlet portion 20a.

The first brackets 52 and 52 are members molded upright with respect to the stopper bracket 51 as mentioned above and attached by welding or a fixing member such as a screw or they may be formed by bending a part of the stopper bracket 51 or may be molded integrally by resin molding. In the center part of the first brackets 52 and 52, vertically long bearing grooves 52a and 52a that support the upper sides of shaft portions 53a and 53a on the both end portion sides of the rotating member 53 are formed. Since the bearing grooves 52a and 52a have vertically long shapes, they can support the shaft portions 53a and 53a while moving them in the vertical direction. That is, the bearing grooves 52a and 52a set a limit value of an upward movement amount of the shaft portions 53a and 53a and also regulate the movement in the front-and-rear direction.

The bearing grooves 52a and 52a are formed substantially in a U-shaped portion with the lower side open, but they may be long holes which are vertically long.

The rotating member 53 is a columnar or a cylindrical member rotatably supported. The strap 20 having one end side attached to the link mechanism 30 side is brought into contact with the rotating member 53 and bent and then, guided to the strap outlet portion 20a so as to reduce an operation load by rotating in compliance with the movement of the strap 20.

The connecting members 54 and 54 are members that support the shaft portions 53a and 53a on the both end portion sides of the rotating member 53 from below, in which bearing grooves 54a and 54a are formed on the upper part and hole portions 54b and 54b to be connected to the movable member 56 on the lower part. Also, they are urged upward by an urging spring 61 all the time, and they rotatably support the shaft portions 53a and 53a of the rotating member 53 between the bearing grooves 52a and 52a of the first bracket 52 and 52 and the bearing grooves 54a and 54a of the connecting members 54 and 54.

It is so configured that only either one of the connecting members 54 and 54 is urged, but it may also be configured such that both the right and left connecting members 54 and 54 are urged upward. The bearing grooves 54a and 54a are formed substantially in a U-shape with the upper part open, but they may be also formed as circular holes that rotatably and pivotally support the shaft portions 53a and 53a of the rotating member 53.

Also, instead of the rotating member 53, it may be configured by a fixed member whose surface is smoothly finished to reduce friction while in sliding contact with the strap 20.

The second bracket 58 includes a right and left pair of support portions 58a and 58a, which are members with substantially U-shaped sections and a second connecting portion 58b connecting the support portions 58a and 58a. It is fastened to the back plate 28 through hole portions 58c, 58c, 58c, and 58c. It is only necessary that the second bracket 58 is attached to the seat back frame 22 and may be so configured to be directly attached to the center frame 22b or the side frame 22a.

The movable member 56 includes plate bodies 56a and 56a in which substantially claw-shaped locking portions 57 are formed at positions that regulate movement of the braking member 60 in the pulling direction and a first connection portion 56b connecting these plate bodies 56a and 56a. The plate bodies 56a and 56a are rotatably mounted to the support portions 58a and 58a of the second bracket 58, respectively, while being also connected to the connecting members 54 and 54 through hole portions 56d and 56d and thus, the plate bodies can be rotated in conjunction with the movement of the rotating member 53 accompanying the operation of the strap 20. To the support portions 58a and 58a of the second bracket 58, the plate bodies are rotatably mounted to shaft holes 58d and 58d and shaft holes 56c and 56c through shaft members 59 and 59. The hole portions 56d and 56d of the movable member 56 are formed on the rear side from the shaft holes 56c and 56c, and the movable member 56 is rotated to the rear side in conjunction with the downward movement of the connecting members 54 and 54. At this time, the locking portions 57 and 57 formed on the front side are moved rearward so that the lock of the braking member 60 can be unlocked. On the other hand, if the connecting members 54 and 54 are moved upward by an urging force of the urging spring 61, the movable member 56 is rotated to the front side in conjunction therewith so as to lock the braking member 60 again.

The braking member 60 is a rectangular cylinder or a columnar member made of resin or metal and fastened to the strap 20 and is fastened so that the strap 20 is inserted through the trunk part thereof with the longitudinal direction with respect to the width direction of the strap 20 by sewing, an adhesive, welding or a fastening member such as a resin rivet, bolt and nut and the like. The length of the braking member 60 in the longitudinal direction is formed longer than the width of the strap 20 and protrudes to both sides of the strap 20 in the width direction.

The strap 20 is disposed while being inserted through a space between the first connection portion 56b of the movable member 56 and the second connection portion 58b of the second bracket 58. As a result, since a path in which the strap 20 is disposed can be limited, even if the strap 20 loosens, the braking member 60 fastened to the strap 20 can be arranged at a predetermined position. The braking member 60 is arranged in the vicinity of the locking portions 57 and 57 all the time, and the lock of the braking member 60 to the locking portions 57 and 57 can be made reliably.

In a state in which the strap 20 is not operated, the strap 20 is urged downward by the link mechanism 30, and thus, the portions on the both sides of the braking member 60 are brought into contact with the lower part sides of the plate bodies 56a and 56a on both sides of the movable member 56 and urge the plate bodies 56a and 56a downward. By way of this urging, a noise or loosening while not in operation is prevented.

At the strap outlet portion 20a, an outlet frame 20b made of resin, not shown, is attached in order to prevent contact of the strap 20 with the strap outlet portion 20a and damage thereof.

Also, the stopper mechanism 50 in this embodiment is configured on the surface side of the seat-back frame 22, but it may be formed on the rear face side.

Setting of a pulling angle width (unlock angle width) of the strap 20 that unlocks the braking member 60 can be adjusted by a formation position or width in the vertical direction of the strap outlet portion 20a, strength of the urging spring 61 or inclination of the bearing grooves 52a and 52a.

The unlock angle width is preferably set to an angle width of approximately 20° up or down with respect to the vehicle body floor 4 surface in the seat S in the installed state.

The adjustment of the unlock angle width by change of a formation position in the vertical direction of the strap outlet portion 20a is a method of adjusting a relative position to the mounting position on the upper limit side of the movement of the rotating member 53. The relatively lower the formation position of the strap outlet portion 20a is located as compared with the disposed position of the rotating member 53, the wider the unlock angle width can be set.

The adjustment of the unlock angle width by the change of the urging spring 61 is a method of adjusting a spring constant of the urging sparing 61 that urges the rotating member 53. The larger the spring constant is, the larger a load that pushes down the rotating member 53 becomes, and the unlock angle width that can bear the load becomes narrower.

The adjustment of the unlock angle width by the inclination of the bearing grooves 52a and 52a is a method of adjusting a direction where the rotating member 53 is moved with respect to the direction where the rotating member 53 is pressed by the strap 20. By giving an inclination angle to the bearing grooves 52a and 52a, the unlock angle width can be adjusted.

A relationship and an operation among each component of the stopper mechanism 50 will be described below referring to operational explanatory diagrams of the stopper mechanism 50 in FIGS. 15A and 15B.

FIG. 15A shows a state of the stopper mechanism 50 during an erroneous operation of the strap 20. That is, this is a case in which the strap 20 extended outside of the rear face of the seat S is pulled upward with respect to the seat back 12.

In this case, the strap 20 is brought into contact with an upper-side edge portion of the strap outlet portion 20a, while it is also brought into contact with the rotating member 53 at a slightly front position. In this case, since a load to push down the rotating member 53 by the strap 20 is smaller than the urging force of the urging spring 61, the rotating member 53 is not moved downward or the movable member 56 interlocking with the rotating member 53 through the connecting members 54 and 54 is not rotated, either. Thus, the lock by the locking portions 57 and 57 regulating the movement of the braking member 60 is not unlocked, the upward movement of the stopper 20 is limited, and power from the strap 20 cannot be transmitted to the link mechanism 30 side.

FIG. 15B shows a state of the stopper mechanism 50 during a normal operation of the strap 20. That is, this is a case in which the strap 20 is pulled rearward with respect to the seat back 12.

In this case, since the strap 20 is pulled rearward of the seat back 12, the rotating member 53 is pushed down by the strap 20, and the movable member 56 interlocking with the movement of the rotating member 53 through the connecting members 54 and 54 is rotated rearward. Thus, the lock of the breaking member 60 by the locking portions 57 and 57 is unlocked, and the power from the strap 20 can be transmitted to the link mechanism 30 side.

The movable member 56 having been rotated by the pulling operation of the strap 20 is returned to a normal position by the urging force of the urging spring 61 by stopping the pulling operation.

FIG. 16 show seat arrangement that can prevent an erroneous operation by the stopper mechanism 50 in this embodiment.

Figure 16A:
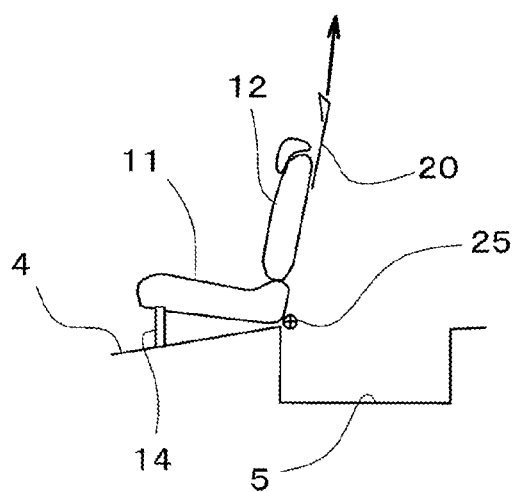
FIGS. 16A-C are explanatory side-view diagrams of seat arrangement in which the stopper mechanism of the stowable vehicle seat according to the first embodiment of the present invention exerts effects.

FIG. 16A shows a case in which the strap 20 is pulled upward in the seat S in the installed state. In this case, by way of the stopper mechanism 50, the lock of the reclining mechanism 27 and the lock of the front-side leg portion 14 are not unlocked. The erroneous operation by a improper or unintentional operation by children or the like is assumed.

If the lock of the reclining mechanism 27 is unlocked in this state, since the seat back 12 is made rotatable forward or rearward, there is a fear that the seat back 12 makes an unpredictable movement for the operator of the strap 20 or the other passengers. In either case, the erroneous operation is prevented by the stopper mechanism 50.

Figure 16B:
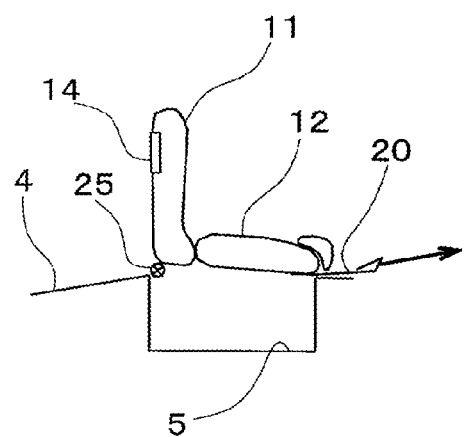

FIG. 16B shows a case in which the strap 20 is pulled upward with respect to the seat back 12 (rearward with respect to the vehicle body direction) while the seat S is used as an open bench. In this case, too, the lock of the reclining mechanism 27 is not unlocked by the stopper mechanism 50.

The open bench refers to a seat installed toward the open rear door side, and in this embodiment, while the seat back 12 in the upstanding state with respect to the seat cushion 11 is rotated rearward and held in a state brought into contact with the vehicle body floor 4 (edge portion of the stowage recess portion 5), the seat back 12 is used as a seat cushion and the seat cushion 11 as a seat back so that the seat S is oriented to the rear door side.

If the lock of the reclining mechanism 27 is unlocked in this state, there is a fear that the seat S is rotated to the stowed position.

Figure 16C:
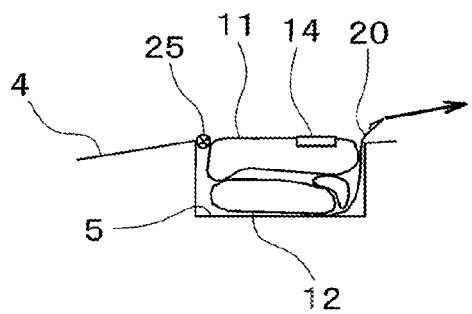

FIG. 16C shows a case in which the strap 20 is subjected to the upward pulling operation with respect to the seat back 12 from the stowed state of the seat S. In this case, too, the lock of the reclining mechanism 27 is not unlocked by the stopper mechanism 50.

Even if the lock of the reclining mechanism 27 is unlocked in this state, there is no particular trouble in the case of the seat S according to this embodiment. However, in a seat provided with a mechanism for aiding the returning operation from the stowed state might give an unpredictable movement to a passenger.

For example, in a case in which a spring urging the seat back 12 in a direction to stand up with respect to the seat cushion 11 is disposed as an aiding mechanism, if the lock of the reclining mechanism 27 is unlocked, the seat back 12 is rotated by the urging element to stand up, and the seat cushion 11 is raised from the stowage recess portion 5.

Second Embodiment

Figure 17:
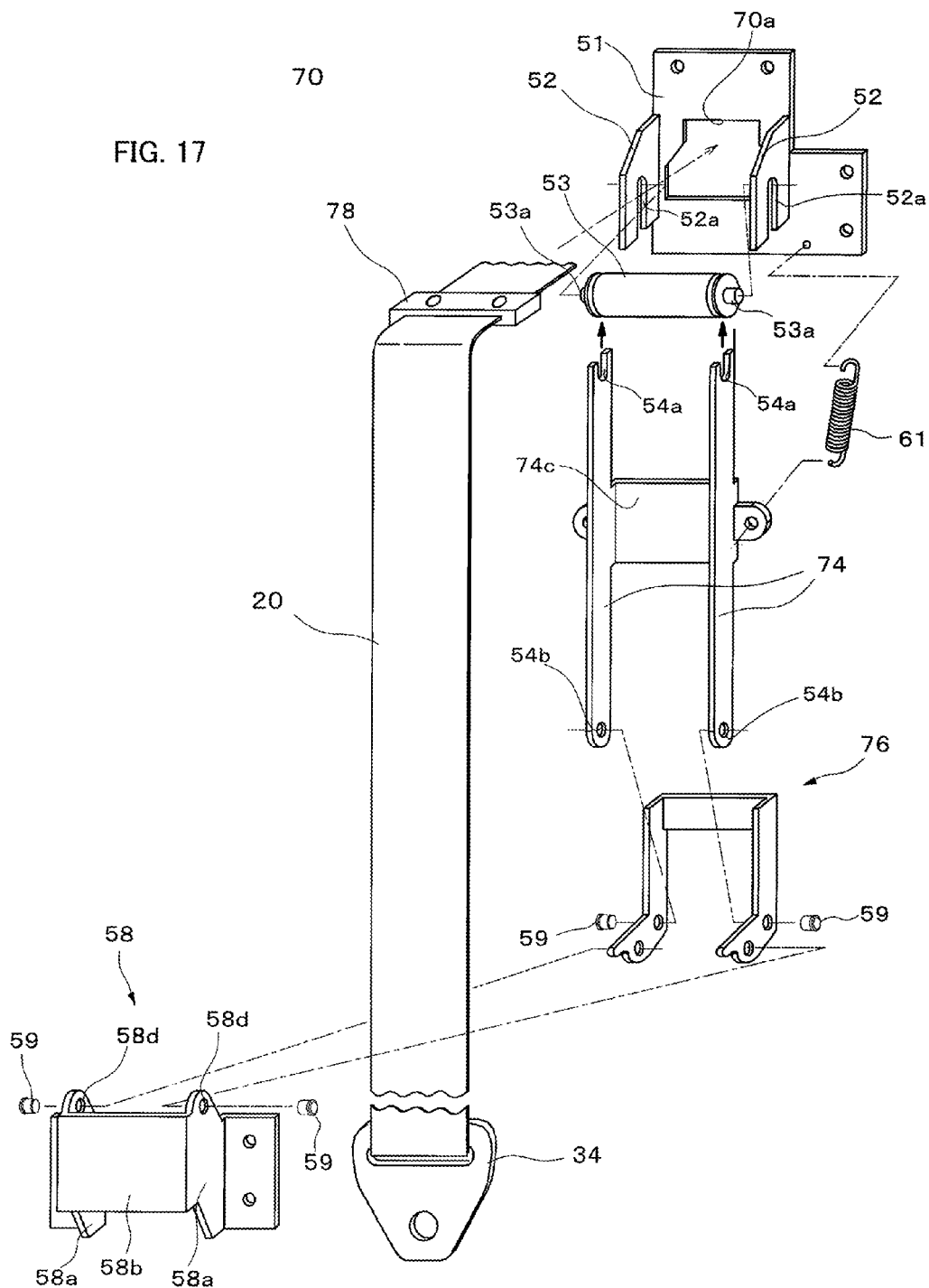
FIG. 17 is an exploded perspective view of a stopper mechanism according to a second embodiment of the present invention.
Figures 18A, 18B:
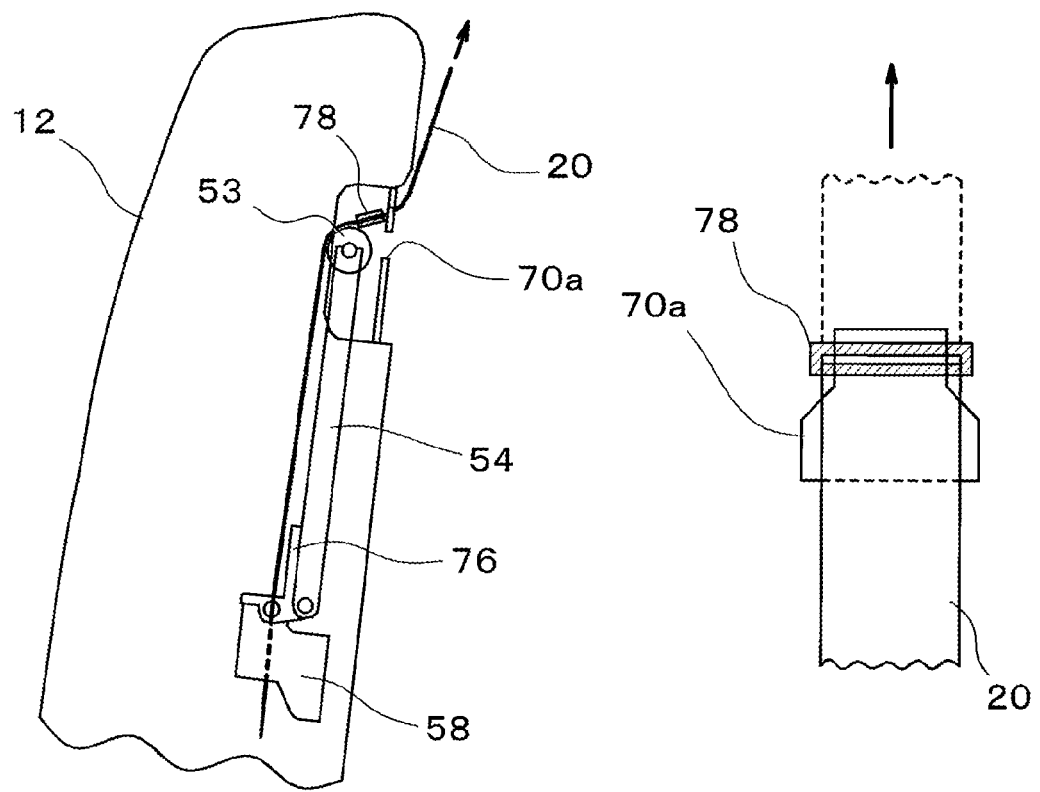
FIGS. 18A, B are operational explanatory side- and rear-view diagrams, respectively, of the stopper mechanism according to the second embodiment of the present invention during an erroneous operation.
Figures 19A, 19B:
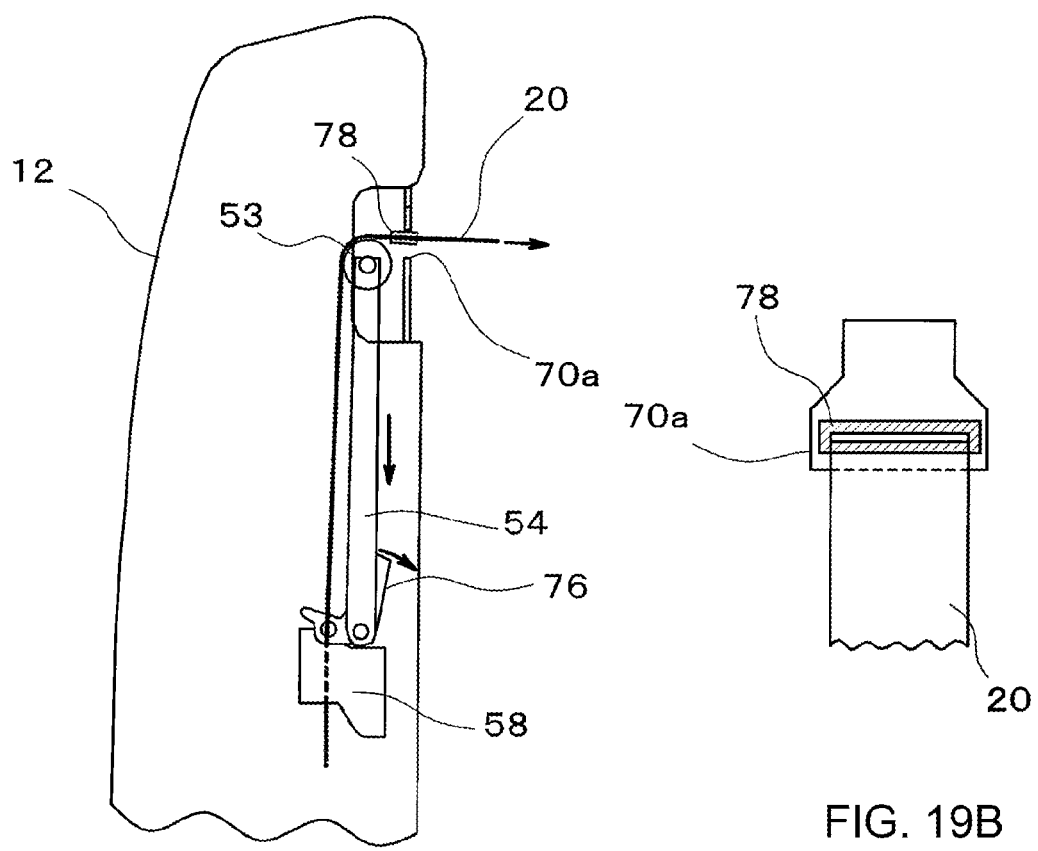
FIG. 19 are operational explanatory side- and rear-view diagrams of the stopper mechanism according to the second embodiment of the present invention during a normal operation.

FIGS. 17 to 19 are explanatory diagrams for a stopper mechanism 70 as an erroneous operation preventing device according to a second embodiment of the present invention, in which FIG. 17 is an exploded perspective view of the stopper mechanism, FIGS. 18A, B are operational explanatory diagrams of the stopper mechanism during an erroneous operation, and FIGS. 19A, B are operational explanatory diagrams of the stopper mechanism during a normal operation.

In each of the following embodiments, the same reference numerals are given to the same members, arrangement and the like as in the above embodiment, and the detailed description will be omitted.

The stopper mechanism 70 shown in FIG. 17 has a shape of a strap outlet portion 70a, disposed positions of a connecting member 74 and a braking member 78, and a shape of a movable member 76 different from those of the stopper mechanism 50 in the first embodiment.

That is, the braking member 78 is fastened to the strap 20 in the vicinity of the strap outlet portion 70a, and the strap outlet portion 70a is formed in a substantially trapezoidal shape having a portion of a narrow width such that the braking member 78 cannot pass through is formed on the upper side.

The movable member 76 is configured such that a member that locks the braking member 78 cannot be disposed. Moreover, a portion through which the braking member 78 of the strap outlet portion 70a can pass is formed slightly lower than the strap outlet portion 20a in the first embodiment.

The connecting member 74 is configured by connecting the connecting members 54 and 54 in the first embodiment by a plate body 74c. By integrating the connecting member 74, a more stable operation can be expected, and assembling performances can be improved.

It is natural that the connecting member 74 can be used instead of the connecting members 54 and 54 in the first embodiment.

A relationship and an operation among each component of the stopper mechanism 70 will be described referring to an explanation of operational diagrams of the stopper mechanism 70 shown in FIGS. 18 and 19.

FIGS. 18A and 18B show a state of the stopper mechanism 70 during the erroneous operation of the strap 20. That is, this is a case in which the strap 20 extended outside of the rear face of the seat S is pulled upward with respect to the seat back 12.

If the strap 20 is pulled upward, since the rotating member 53 cannot be pushed down, the braking member 78 cannot be moved downward but is locked by the narrow-width portion formed on the upper side of the strap outlet portion 70a. At this time, the operating force from the strap 20 cannot be transmitted to the link mechanism 30 side.

FIGS. 19A and 19B show a state of the stopper mechanism 70 during the normal operation of the strap 20.

Since the strap 20 is pulled rearward of the seat back 12, the rotating member 53 is pushed down by the strap 20, and the braking member 78 is also moved downward. At this time, the braking member 78 can pass through a wide width portion on the lower side of the strap outlet portion 70a, and the operating force from the strap 20 can be transmitted to the link mechanism 30 side.

Also, the strap outlet portion 70a in this embodiment is formed in the substantially trapezoidal shape having the narrow width portion formed on the upper side, but the narrow-width portion may be formed also on the lower side. By configuring as above, the stopper mechanism 70 is also operated when the strap 20 is pulled downward, not only upward, and transmission of the operating force to the link mechanism 30 can be prevented.

As explained above, by this embodiment, too, the advantages similar to those of the stopper mechanism 50 according to the first embodiment can be obtained.

These designs can be also applied to a stowable vehicle seat using both the strap 20 and a lever as stowing and returning operating elements. That is, in a seat configured such that the lock of the leg portion can be unlocked by an operation of the lever, while the lock of reclining is unlocked by an operation of the strap 20, and the seat can be rotated rearward, by attaching the stopper mechanism 50 or the stopper mechanism 70 to the strap 20, the same advantages as the working advantages according to the first embodiment and the second embodiment can be obtained.

According to the stopper mechanisms 50 and 70, if the strap 20 to be operated in the stowing and returning operation of the seat S is pulled upward with respect to the seat back 12, the operating force cannot be transmitted to the link mechanism 30. Thus, movement of the seat S that cannot be expected by a passenger due to an erroneous operation such as a improper or unintentional operation by children can be prevented. Also, during the seat arrangement, too, unexpected movement of the seat S by a passenger due to an erroneous operation can be prevented.

Moreover, since reliability of the seat operation is improved by using the stopper mechanisms 50 and 70, description in a manual to promote awareness or label display which has been made against an erroneous operation can be made unnecessary.

Each configuration described above can be combined with each other as long as the gist of the present invention is not departed.

Also, in the above-mentioned embodiments, the third row seats divided into right and left in an automobile was explained as a specific example, but not limited to that, it is natural that the similar configuration can be applied to a long integrally-formed bench-type seat, a passenger's seat or the other rear seats.

| TABLE OF REFERENCE CHARACTERS | |
|---|---|
| S | seat |
| F | seat frame |
| S1 | right-side seat |
| S2 | left-side seat |
| 4 | vehicle body floor |
| 5 | stowage recess portion |
| 11 | seat cushion |
| 12 | seat back |
| 13 | head rest |
| 14 | front-side leg portion |
| 20 | strap |
| 20a, 70a | strap outlet portion |
| 20b | outlet frame |
| 21 | seat-cushion frame |
| 21a | back-frame support portion |
| 22 | seat-back frame |
| 22a | side frame |
| 22b | center frame |
| 23 | pillar support portion |
| 24 | front-side leg portion frame |
| 25 | seat support portion |
| 27 | reclining mechanism |
| 28 | back plate |
| 28a | guiding hole portion |
| 30 | link mechanism |
| 31 | first link member |
| 31a | first shaft portion |
| 31b | long hole |
| 32 | second link member |
| 32b | locking recess portion |
| 33 | third link member |
| 33a | second shaft portion |
| 34 | strap connecting member |
| 34a, 40c, 41c, 42c, 57 | locking portion |
| 35 | locking projection |
| 40 | reclining release wire |
| 40a | reclining release cable |
| 40b, 41b, 42b | end-portion member |
| 41 | leg-portion release wire |
| 41a | led-portion release cable |
| 42 | cancel wire |
| 42a | cancel cable |
| 43 | locking claw |
| 43a | locking-claw rotating shaft |
| 44 | leg-portion striker |
| 45, 61 | urging spring |
| 48 | coil spring |
| 49 | locking rib |
| 50, 70 | stopper mechanism |
| 51 | stopper bracket |
| 52 | first bracket |
| 52a, 54a | bearing groove |
| 53 | rotating member |
| 53a | shaft portion |
| 54, 74 | connecting member |
| 56, 76 | movable member |
| 56a, 74c | plate body |
| 56b | first connection portion |
| 56c, 58d | shaft hole |
| 54b, 56d, 58c | hole portion |
| 58 | second bracket |
| 58a | support portion |

-continued

TABLE OF REFERENCE CHARACTERS

| 58b | second connection portion |
|---|---|
| 59 | shaft member |
| 60, 78 | braking member |

The invention claimed is:

1. An erroneous operation preventing device that regulates a stowing or folding operation of a rearwardly rotatable stowable vehicle seat that is rotated rearward and stowed by pulling a strap, by locking a braking member secured to the strap, comprising:
- an opening portion for guiding said strap to a rear face side of a seat back of said stowable vehicle seat;
- a rotating member that contacts said strap and has two end portion sides;
- first brackets standing up separately on both sides of said opening portion in either direction of a front or the rear face side of said seat back and supporting the both end portion sides of said rotating member from one side;
- a connecting member supporting the both end portion sides of said rotating member at least from the opposite sides;
- an urging element for urging at least one of said connecting member to the side of the first bracket all the time;
- a second bracket disposed in either direction of the front or rear face side of said seat back; and
- a movable member rotatably supported by said second bracket and connected to said connecting member.

2. The erroneous operation preventing device according to claim 1, wherein:
said movable member includes:
- a pair of plate bodies rotatably and pivotally supported and separately disposed; and
- a first connection portion that connects said plate bodies; and
at least one of said plate bodies has a locking portion that locks said braking member of said strap and extends in a rotating direction.

3. The erroneous operation preventing device according to claim 2, wherein:
said second bracket includes:
- a pair of support portions rotatably supporting each of said pair of plate bodies disposed on said movable member; and
- a second connection portion connecting said pair of support portions; and
said strap is inserted through between said first connection portion of said movable member and the second connection portion of said second bracket.

4. The erroneous operation preventing device according to claim 3, wherein:
by pulling said strap to the rear side of said seat back:
said rotating member is pushed down by said strap; and
by rotating said movable member through said connecting member, a lock state of said braking member by said locking portion is unlocked so that the regulation on the movement of said strap is canceled.

5. The erroneous operation preventing device according to claim 3, wherein:
by pulling said strap to the rear side of said seat back,
said rotating member is pushed down by said strap so that said braking member of said strap can pass through said opening portion.

6. The erroneous operation preventing device according to claim 2, wherein:
by pulling said strap to the rear side of said seat back:
said rotating member is pushed down by said strap; and
by rotating said movable member through said connecting member, a lock state of said braking member by said locking portion is unlocked so that the regulation on the movement of said strap is canceled.

7. The erroneous operation preventing device according to claim 1, wherein
said opening portion partially has a portion with a small opening width through which said braking member of said strap cannot pass.

8. The erroneous operation preventing device according to claim 7, wherein:
by pulling said strap to the rear side of said seat back,
said rotating member is pushed down by said strap so that said braking member of said strap can pass through said opening portion.

9. A rearwardly rotatable stowable vehicle seat, comprising:
an erroneous operation preventing device that regulates a stowing or folding operation of the stowable vehicle seat that is rotated rearward and stowed by pulling a strap, by locking a braking member secured to said strap, wherein said erroneous operation preventing device comprises:
- an opening portion for guiding said strap to a rear face side of a seat back of said stowable vehicle seat,
- a rotating member that contacts said strap and has two end portion sides,
- first brackets standing up separately on both sides of said opening portion in either direction of a front or the rear face side of said seat back and supporting the both end portion sides of said rotating member from one side,
- a connecting member supporting the both end portion sides of said rotating member at least from the opposite sides,
- an urging element for urging at least one of said connecting member to the side of said first bracket all the time,
- a second bracket disposed in either direction of the front or rear face side of said seat back, and
- a movable member rotatably supported by said second bracket and connected to said connecting member.

* * * * *